US011711997B2

(12) United States Patent
Ritland et al.

(10) Patent No.: US 11,711,997 B2
(45) Date of Patent: Aug. 1, 2023

(54) SEED FURROW LIQUID APPLICATION SYSTEMS, METHODS, AND APPARATUSES

(71) Applicant: 360 Yield Center, LLC, Morton, IL (US)

(72) Inventors: Tyler R. Ritland, Tremont, IL (US); Connor M. Hesterberg, Deer Creek, IL (US); Timothy A Sauder, Tremont, IL (US)

(73) Assignee: 360 YIELD CENTER, LLC, Morton, IL (US)

( * ) Notice: Subject to any disclaimer, the term of this patent is extended or adjusted under 35 U.S.C. 154(b) by 550 days.

(21) Appl. No.: 16/639,832

(22) PCT Filed: Aug. 21, 2018

(86) PCT No.: PCT/US2018/047367
§ 371 (c)(1),
(2) Date: Feb. 18, 2020

(87) PCT Pub. No.: WO2019/040518
PCT Pub. Date: Feb. 28, 2019

(65) Prior Publication Data
US 2020/0245526 A1 Aug. 6, 2020

Related U.S. Application Data

(60) Provisional application No. 62/671,000, filed on May 14, 2018, provisional application No. 62/633,660, (Continued)

(51) Int. Cl.
*A01C 7/06* (2006.01)
*F16K 31/08* (2006.01)
(Continued)

(52) U.S. Cl.
CPC .............. *A01C 7/06* (2013.01); *A01C 23/007* (2013.01); *F16K 31/082* (2013.01); *A01C 7/105* (2013.01); *A01C 21/007* (2013.01); *A01C 23/028* (2013.01)

(58) Field of Classification Search
CPC ....... A01C 7/06; A01C 21/002; A01C 21/007; A01C 23/005; A01C 23/007;
(Continued)

(56) References Cited

U.S. PATENT DOCUMENTS 4,403,765 A    9/1983  Fisher
5,169,117 A *  12/1992  Huang ................. F16K 31/086
                                              251/38
(Continued)

FOREIGN PATENT DOCUMENTS

FR    2566089     * 12/1985    .......... F16K 11/0743
FR    2566089 A1 * 12/1985    ........... F16K 31/082
(Continued)

OTHER PUBLICATIONS

Office Action issued in Canadian Application No. 3,073,319 dated Mar. 15, 2021, 5 pages.
(Continued)

*Primary Examiner* — Alicia Torres
(74) *Attorney, Agent, or Firm* — Klintworth & Rozenblat IP LLP

(57) ABSTRACT

In one aspect, an agricultural row unit is provided an includes a frame, an opener disc rotatably coupled to the frame and configured to open a seed trench, and an applicator assembly coupled to the frame and configured to apply a liquid. The applicator assembly including a housing and a valve coupled to the housing and configured to be in fluid communication with a fluid source. The valve is electronically powered to move to an open condition, in which fluid
(Continued)

is configured to pass through and emit from the valve, and electronically powered to move to a closed condition, in which fluid is inhibited from passing through and emitting from the valve. The agricultural row unit also includes a closing wheel coupled to the frame and configured to close the seed trench.

17 Claims, 28 Drawing Sheets

Related U.S. Application Data filed on Feb. 22, 2018, provisional application No. 62/547,983, filed on Aug. 21, 2017.

(51) Int. Cl.
*A01C 23/00* (2006.01)
*A01C 7/10* (2006.01)
*A01C 21/00* (2006.01)
*A01C 23/02* (2006.01)

(58) Field of Classification Search
CPC ... A01C 23/023; A01C 23/028; A01C 23/047; F16K 31/082; F16K 11/0716; F16K 39/00; F16K 39/02; F16K 39/022; F16K 39/04; F16K 39/06; F16K 47/0111
See application file for complete search history.

(56) References Cited

U.S. PATENT DOCUMENTS

| | | |
|---|---|---|
| 5,251,667 A | 10/1993 | Kunz et al. |
| 10,502,330 B2 * | 12/2019 | Balkenhol ............... A01J 7/022 |
| 2004/0051065 A1 * | 3/2004 | Petro ..................... F16K 31/086 |
| | | 251/63.4 |
| 2007/0290677 A1 | 12/2007 | Christianson et al. |
| 2008/0006791 A1 | 1/2008 | Reinicke |
| 2010/0070095 A1 | 3/2010 | Inagaki et al. |
| 2013/0228711 A1 | 9/2013 | Harrell et al. |
| 2017/0211481 A1 * | 7/2017 | Denton ..................... F16K 1/12 |
| 2017/0251590 A1 * | 9/2017 | Kolb ........................ A01C 7/06 |
| 2017/0348718 A1 * | 12/2017 | Preheim ............... A01C 23/007 |
| 2019/0032809 A1 * | 1/2019 | Kumar ................ F16K 31/0675 |

FOREIGN PATENT DOCUMENTS

| | | | | |
|---|---|---|---|---|
| FR | 2669706 A1 * | 5/1992 | .......... | F16K 31/088 |
| FR | 2713735 A1 * | 6/1995 | .......... | F16K 11/0743 |
| WO | 2016061485 A1 | 4/2016 | | |

OTHER PUBLICATIONS

International Search Report and Written Opinion for PCT Application No. PCT/US18/47367 dated Nov. 7, 2018, 9 pages.

* cited by examiner

SEED FURROW LIQUID APPLICATION SYSTEMS, METHODS, AND APPARATUSES

RELATED APPLICATIONS

The present application claims the priority benefit of U.S. Provisional Patent Application Nos. 62/547,983, filed Aug. 21, 2017, 62/633,660, filed Feb. 22, 2018, and 62/671,000, filed May 14, 2018 and International Patent Application No. PCT/US18/47367 filed Aug. 21, 2018, all of which are incorporated by reference herein.

FIELD OF THE DISCLOSURE

The present application generally relates to agricultural equipment and, more particularly, to agricultural applicators for crop inputs.

BACKGROUND

Crop input applicators are used to apply crop inputs (e.g., liquid, fertilizer, nitrogen, etc.) into soil. Such crop inputs may be applied during planting or subsequent to planting.

SUMMARY

In one aspect, an agricultural row unit is provided an includes a frame, an opener disc rotatably coupled to the frame and configured to open a seed trench, and an applicator assembly coupled to the frame and configured to apply a liquid. The applicator assembly including a housing and a valve coupled to the housing and configured to be in fluid communication with a fluid source. The valve is electronically powered to move to an open condition, in which fluid is configured to pass through and emit from the valve, and electronically powered to move to a closed condition, in which fluid is inhibited from passing through and emitting from the valve. The agricultural row unit also includes a closing wheel coupled to the frame and configured to close the seed trench.

In one aspect, the valve may be electro-magnetically controlled to move the valve to the open condition and to the closed condition.

In one aspect, the open condition may be a first open condition, wherein the valve may be electronically powered to move to a plurality of open conditions to provide variable liquid flow rates.

In one aspect, the valve may include an inlet, an outlet, and a plunger disposed within a plunger chamber. The inlet, the outlet, and the plunger chamber are all in fluid communication with each other and together may define a liquid flow path through the housing of the valve. The plunger may be between the inlet and the outlet and may be electronically moveable within the plunger chamber to selectively inhibit liquid flow along the liquid flow path, which may be associated with the closed condition, and selectively allow liquid to pass through along the liquid flow path, which may be associated with the open condition.

In one aspect, the plunger may include a magnet, and the valve may further include an electrical coil wrapped around an exterior of the plunger chamber to electrically interact with the magnet to move the plunger within the plunger chamber.

In one aspect, the magnet may be one of a plurality of magnets included by the plunger, and the electrical coil may be one of a plurality of electrical coils wrapped around an exterior of the plunger chamber to electrically interact with the plurality of magnets to move the plunger within the plunger chamber.

In one aspect, the plunger may include a displacement magnet, and the valve may further include a displacement sensor configured to sense a location of the displacement magnet.

In one aspect, liquid flowing along the flow path may enter the plunger chamber from a first end of the plunger chamber and a second end of the plunger chamber.

In one aspect, the valve may further define a liquid chamber and a pressure chamber along the liquid flow path and in fluid communication with each other and with the inlet, the plunger chamber and the outlet. The liquid may flow through the inlet, into the liquid chamber and then a first portion of the liquid from the liquid chamber may flow from the liquid chamber into the first end of the plunger chamber and a second portion of the liquid in the liquid chamber may flow from the liquid chamber, through the pressure chamber, and into the second end of the plunger chamber.

In one aspect, the plunger may define a plunger conduit there through, and liquid in the plunger chamber may flow through the plunger conduit.

In one aspect, liquid in the plunger chamber may selectively flow in both directions through the plunger conduit.

In one aspect, fluid in the plunger chamber may flow in a first direction through the plunger conduit with the valve in the open condition, and fluid in the plunger chamber may flow in a second direction through the plunger conduit with the valve in the closed condition.

In one aspect, the agricultural row unit may further include a seed conveyor. The valve may be coupled to the seed conveyor.

In one aspect, the agricultural row unit may further include a seed sensor configured to identify information associated with a seed emitted by the seed conveyor. The valve may be actuated based on the information associated with the seed.

In one aspect, an agricultural row unit is provided and includes a frame, an opener disc rotatably coupled to the frame and configured to open a seed trench, and an applicator assembly coupled to the frame and configured to apply a liquid. The applicator assembly including a housing and a valve coupled to the housing and configured to be in fluid communication with a fluid source. The valve is movable between an open condition, in which fluid is configured to pass through and emit from the valve, and a closed condition, in which fluid is inhibited from passing through and emitting from the valve. The agricultural row unit also includes an ultrasonic flow meter in fluid communication with the fluid source and the applicator assembly. The ultrasonic flow meter is configured to measure a flow rate of fluid passing through the valve. The agricultural row unit further includes a closing wheel coupled to the frame and configured to close the seed trench.

In one aspect, the ultrasonic flow meter may be disposed within the housing of the valve.

In one aspect, the valve may include an inlet, an outlet, and a plunger disposed within a plunger chamber. The inlet, the outlet, and the plunger chamber may all be in fluid communication with each other and together may define a liquid flow path through the housing of the valve. The plunger may be between the inlet and the outlet and may be moveable within the plunger chamber to selectively inhibit liquid flow along the liquid flow path, which is associated with the closed condition, and selectively allow liquid to pass through along the liquid flow path, which is associated with the open condition.

In one aspect, the ultrasonic flow meter may be disposed along the liquid flow path between the inlet and the outlet.

In one aspect, the ultrasonic flow meter may be disposed along the liquid flow path between the inlet and the plunger chamber.

In one aspect, the plunger may include a magnet. The valve may further include an electrical coil wrapped around an exterior of the plunger chamber and in electrical communication with an electrical source. Electrical current may be sent through the electrical coil in a first direction to electromagnetically interact with the magnet to move the plunger to the open condition and in a second direction to electromagnetically interact with the magnet to move the plunger to the closed condition.

In one aspect, the magnet may be one of a plurality of magnets and the electrical coil may be one of a plurality of electrical coils.

In one aspect, the agricultural row unit may further include a seed conveyor, and the valve may be coupled to the seed conveyor.

In one aspect, the agricultural row unit may further include a seed sensor configured to identify information associated with a seed emitted by the seed conveyor. The valve may be actuated based on the information associated with the seed.

DESCRIPTION

Figure 1:
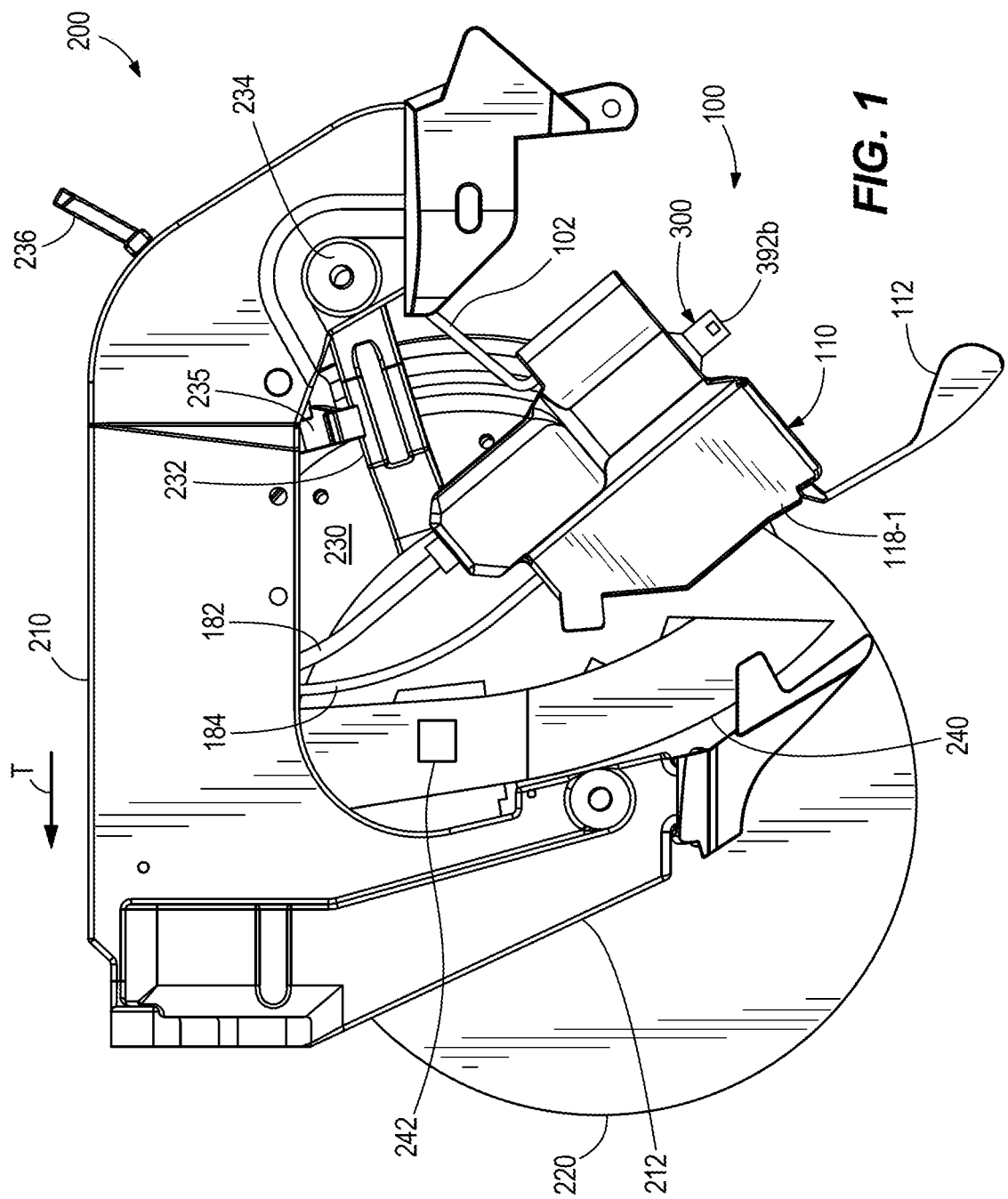
FIG. 1 is a left side elevation view of one example of a liquid applicator assembly mounted to one example of a portion of a planter row unit.

Referring to the drawings, wherein like reference numerals designate identical or corresponding parts throughout the several views, FIGS. 1-5 illustrate one example of an applicator assembly 100 mounted to one example of a row unit 200 of an agricultural device such as, for example, a planter.

The row unit 200 may be any row unit configured to deposit seeds in the ground (e.g., by first forming seed furrow). In the illustrated example, the row unit 200 includes a subframe 210 which may be mounted to a transversely-extending planter toolbar (not shown) such as by a set of parallel arms (not shown). The toolbar draws the planter along the travel direction T generally indicated in FIG. 1.

Figure 2:
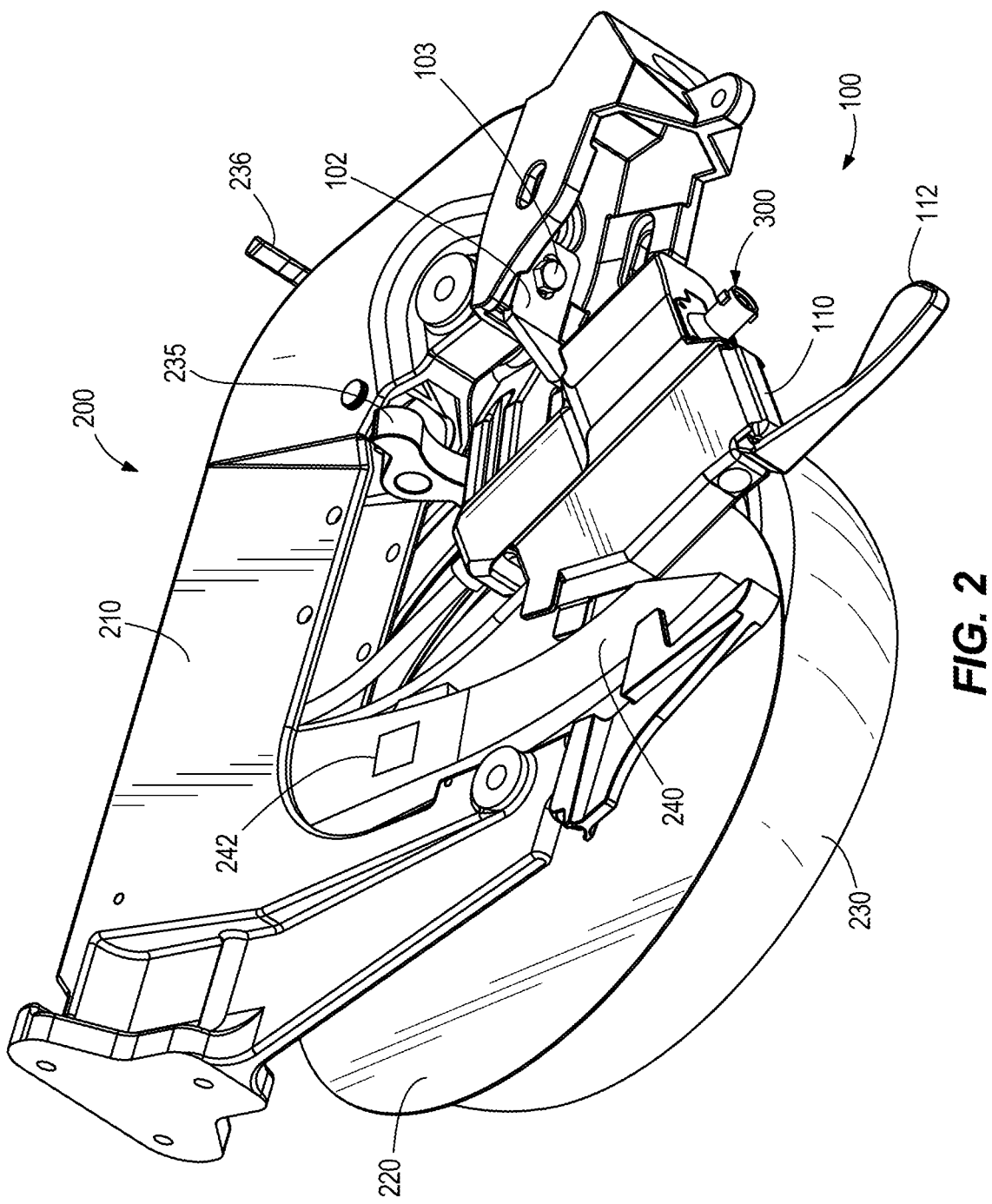
FIG. 2 is a bottom, left perspective view of the liquid applicator assembly and portion of the planter row unit of FIG. 1.
Figure 3:
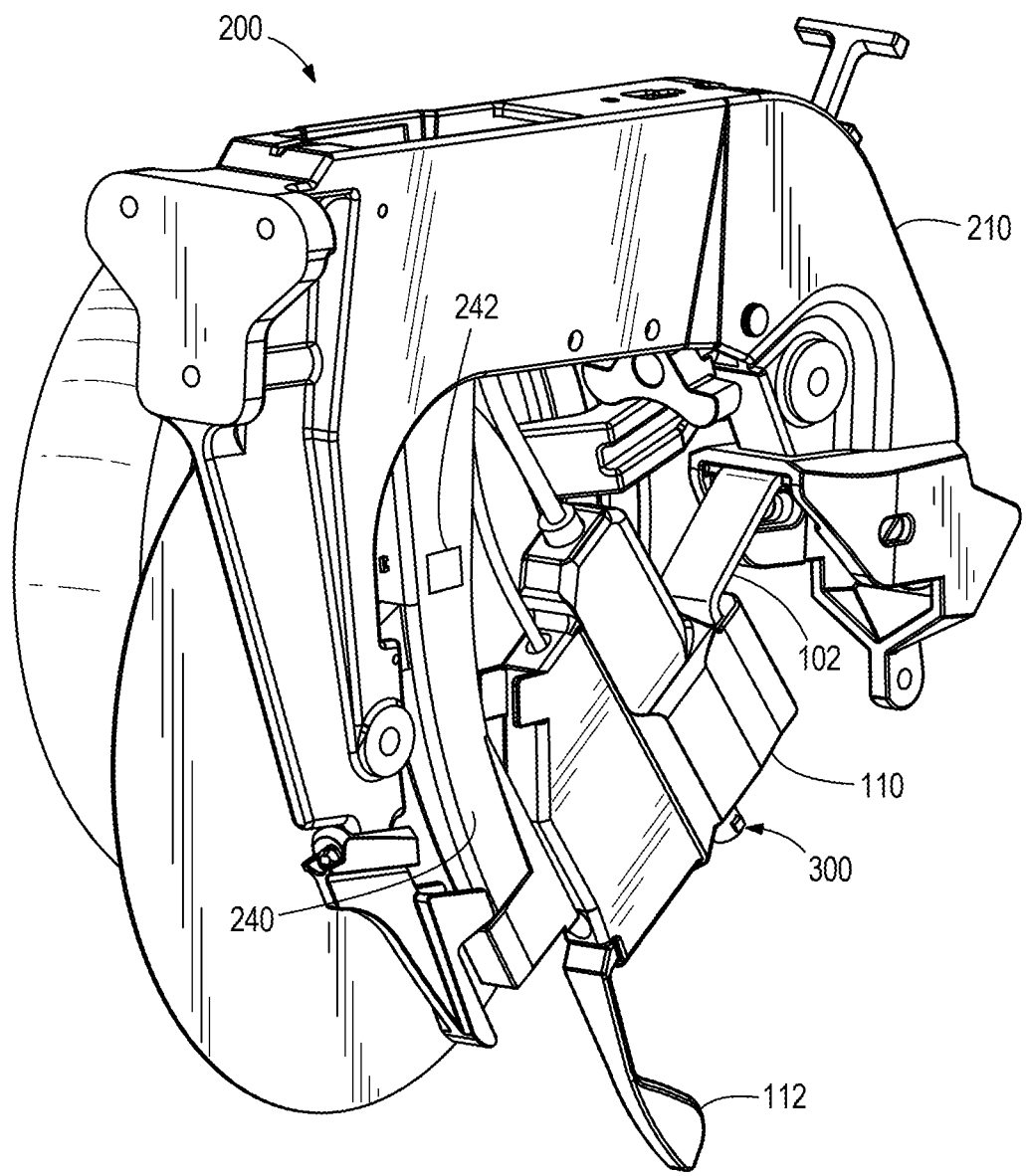
FIG. 3 is top, left perspective view of the liquid applicator assembly and portion of the planter row unit of FIG. 1.
Figure 4:
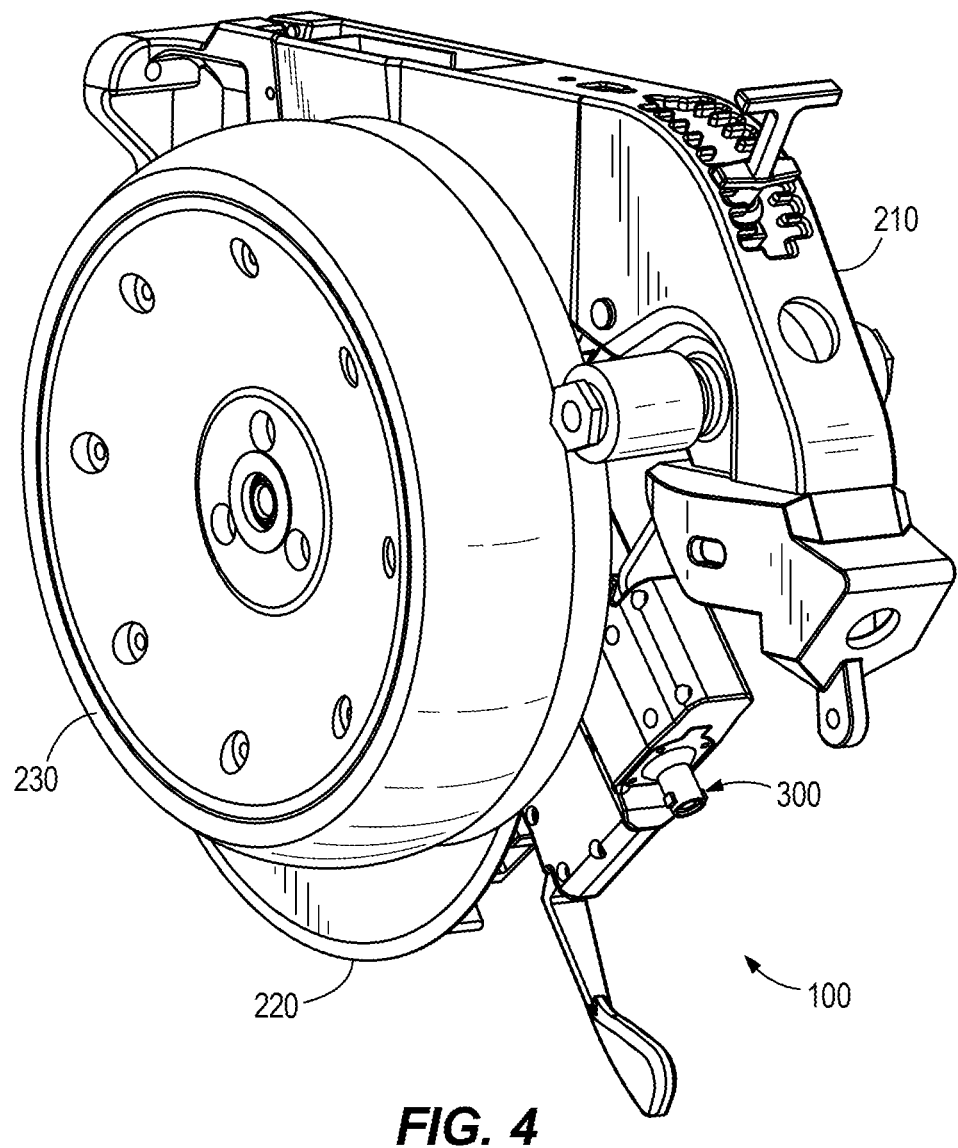
FIG. 4 is top, right perspective view of the liquid applicator assembly and portion of the planter row unit of FIG. 1.
Figure 5:
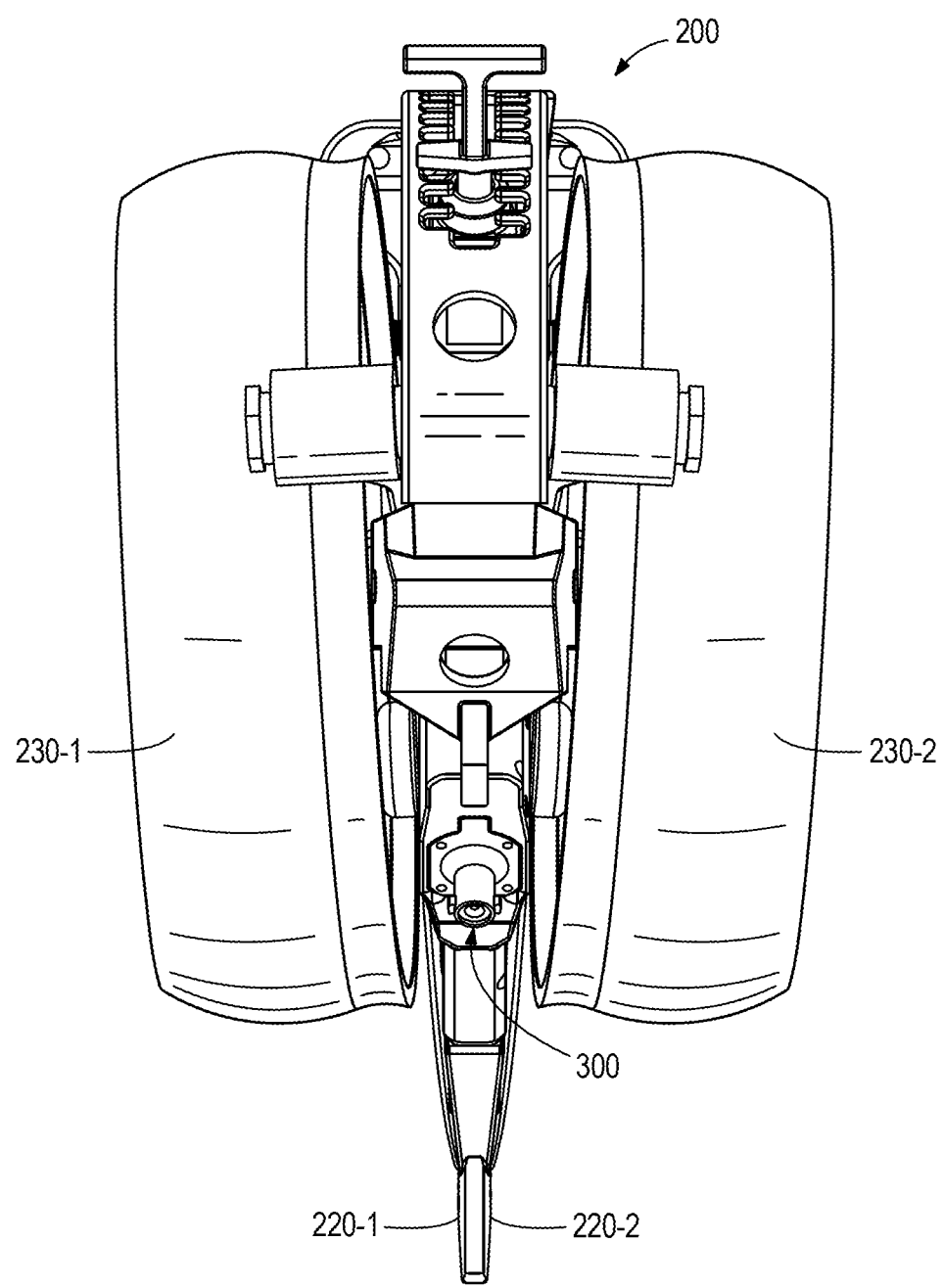
FIG. 5 is a rear elevation view of the liquid applicator assembly and at least a portion of the planter row unit of FIG. 1.

The subframe 210 optionally includes a downwardly extending shank 212 rollingly supporting one or more opener discs 220 (e.g., 220-1 and 220-2). The opener discs 220 are optionally disposed to open a furrow (e.g., generally V-shaped furrow) in a soil surface as the row unit 200 moves along the travel direction T. In order to set the depth of the furrow, in some examples, one or more gauge wheels 230 are supported on the row unit and disposed to roll along the surface of the soil. Each gauge wheel 230 is optionally rollingly mounted to an associated gauge wheel arm 232 which is in turn pivotally mounted (e.g., at a pivot 234) to the subframe 210. Referring to FIG. 2, in some examples the maximum height of each gauge wheel arm 232 (and thus the depth of the furrow) is set by a stop 235 (e.g., rocker) which is optionally height-adjustable using a depth setting interface 236 such as a lever.

Figure 7:
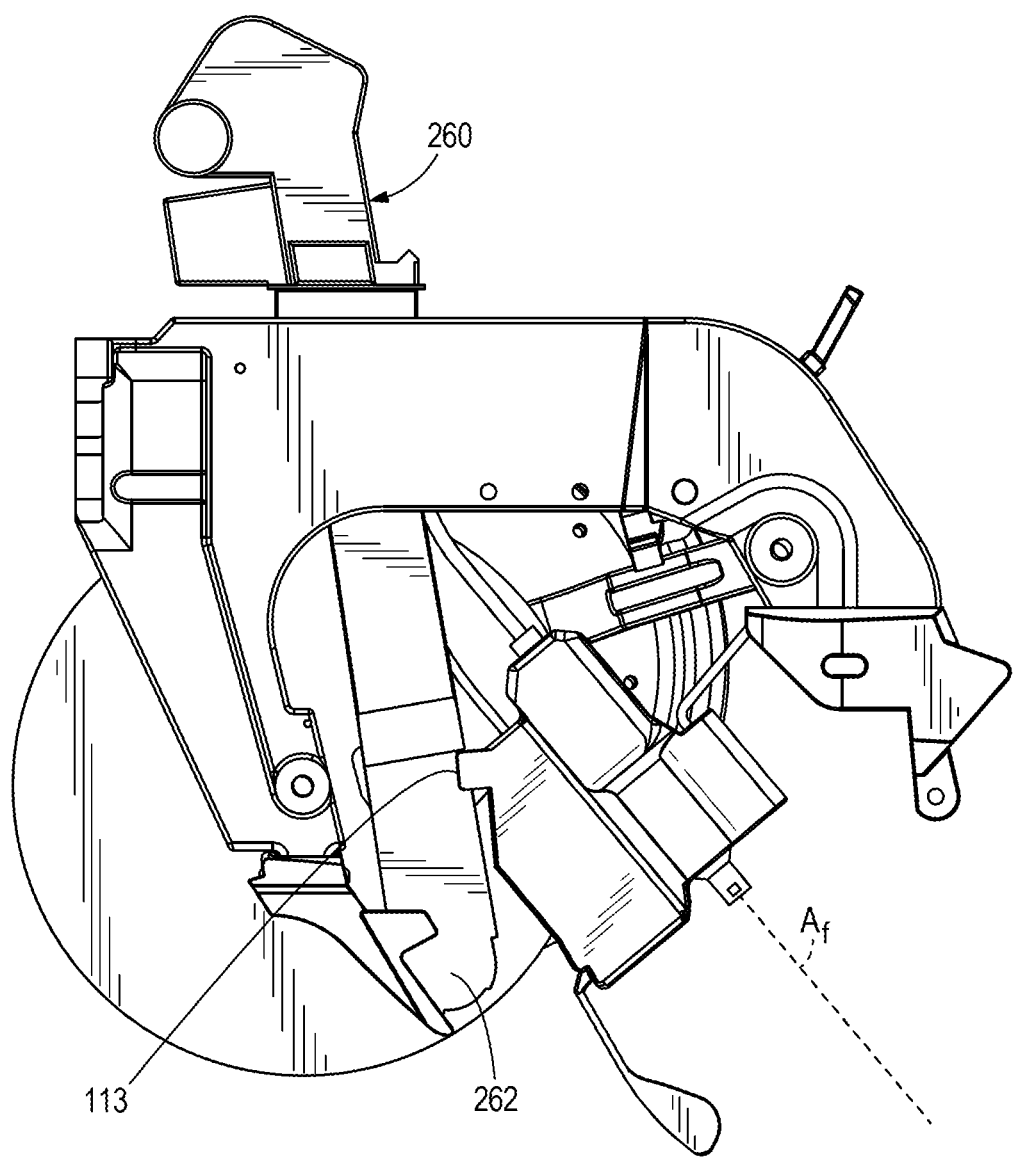
FIG. 7 is a left side elevation view of the liquid applicator assembly of FIG. 1 mounted to one example of a portion of a planter row unit having one example of a seed conveyor.

A seed tube 240 or other seed conduit or seed conveyor is optionally supported on the subframe 210 to deliver seeds from a meter (not shown) such as a pneumatic seed meter to the seed furrow. In some examples, a seed conveyor 262 such as a seed belt (see FIG. 7) or seed brush is incorporated in the row unit instead of a seed tube 240.

Figure 6:
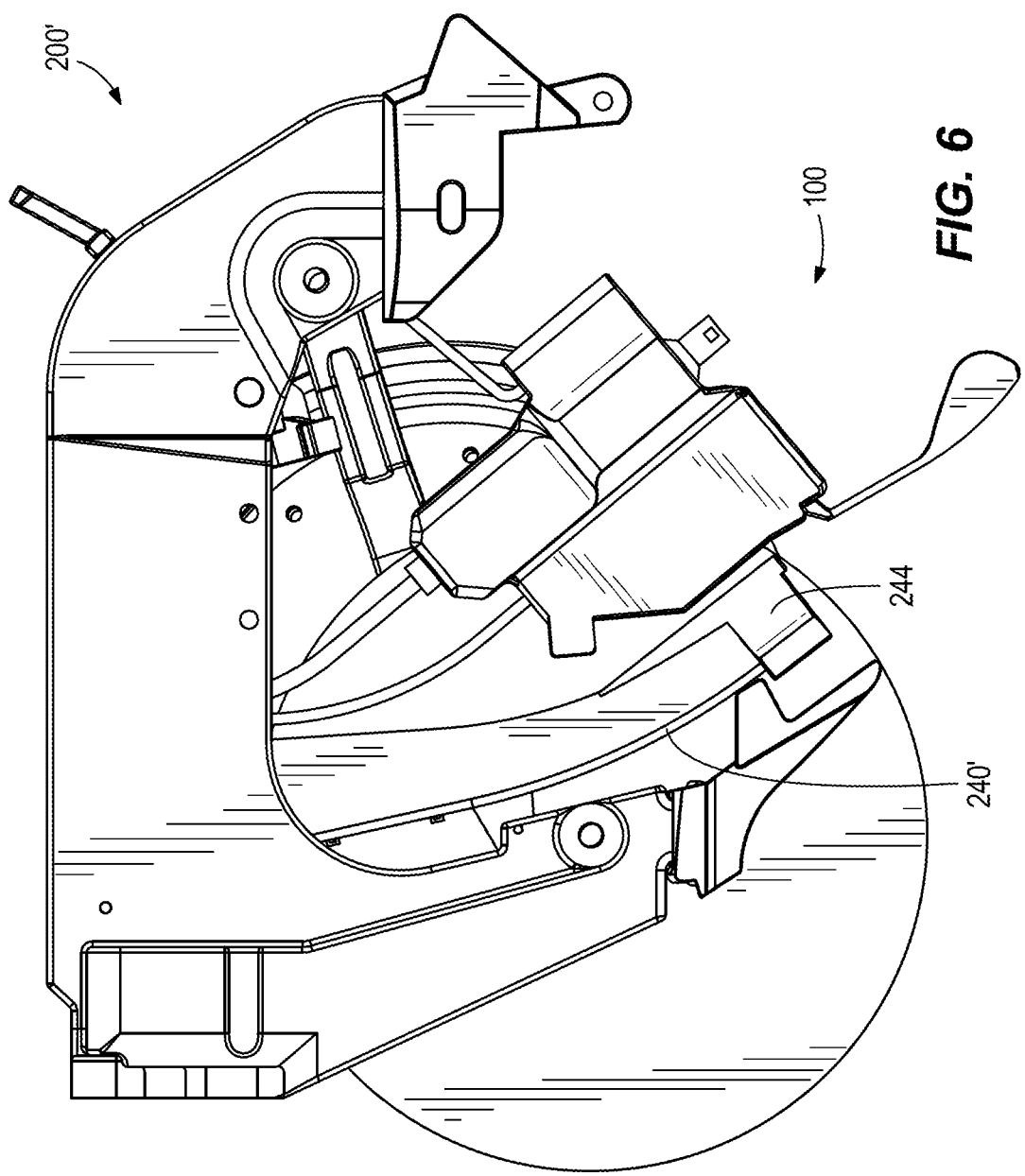
FIG. 6 is a left side elevation view of the liquid applicator assembly of FIG. 1 mounted to one example of a portion of a planter row unit having one example of an electromagnetic seed sensor.

A seed sensor 242 is optionally provided on the seed tube 240 for detection of one or more seeds passing through the seed tube 240. In some alternative examples such as that illustrated in FIG. 6, a planter row unit 200' may include a modified seed tube 240' which additionally or alternatively has a seed sensor 244 (e.g., electromagnetic seed sensor) mounted to the end of the seed tube 240'.

The applicator assembly 100 is optionally supported on a bracket 102 which may be mounted (e.g., by bolt 103—see FIG. 2) to a rearward portion of the subframe 210. In some examples, the applicator assembly 100 is supported alternatively or additionally by forwardly-extending brackets securing the applicator assembly 100 to the shank 212 or seed tube 240.

Figure 8:
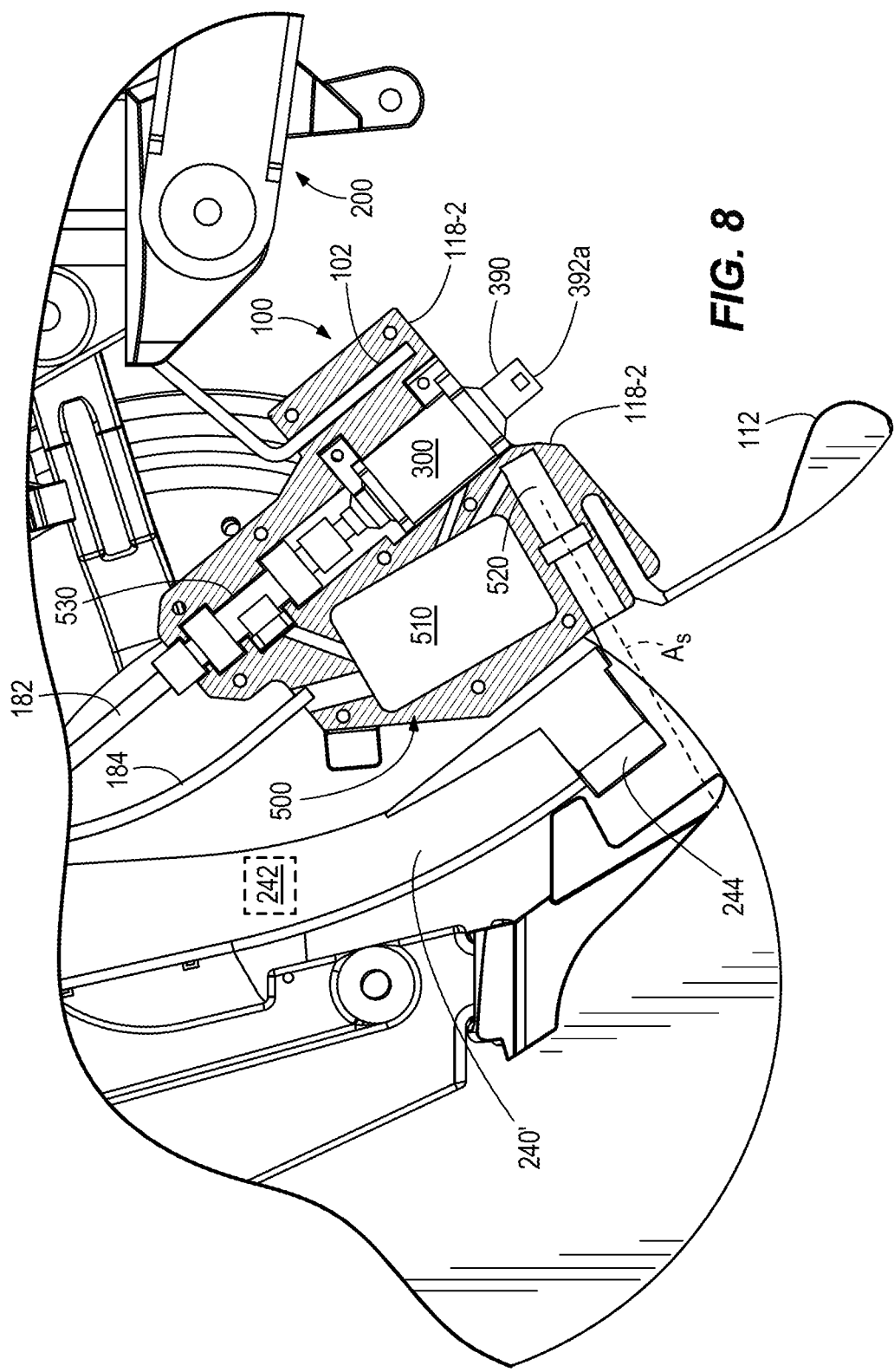
FIG. 8 is an enlarged left side elevation view of the liquid applicator assembly of FIG. 1 with a housing portion thereof not shown in order to illustrate certain components.
Figure 9:
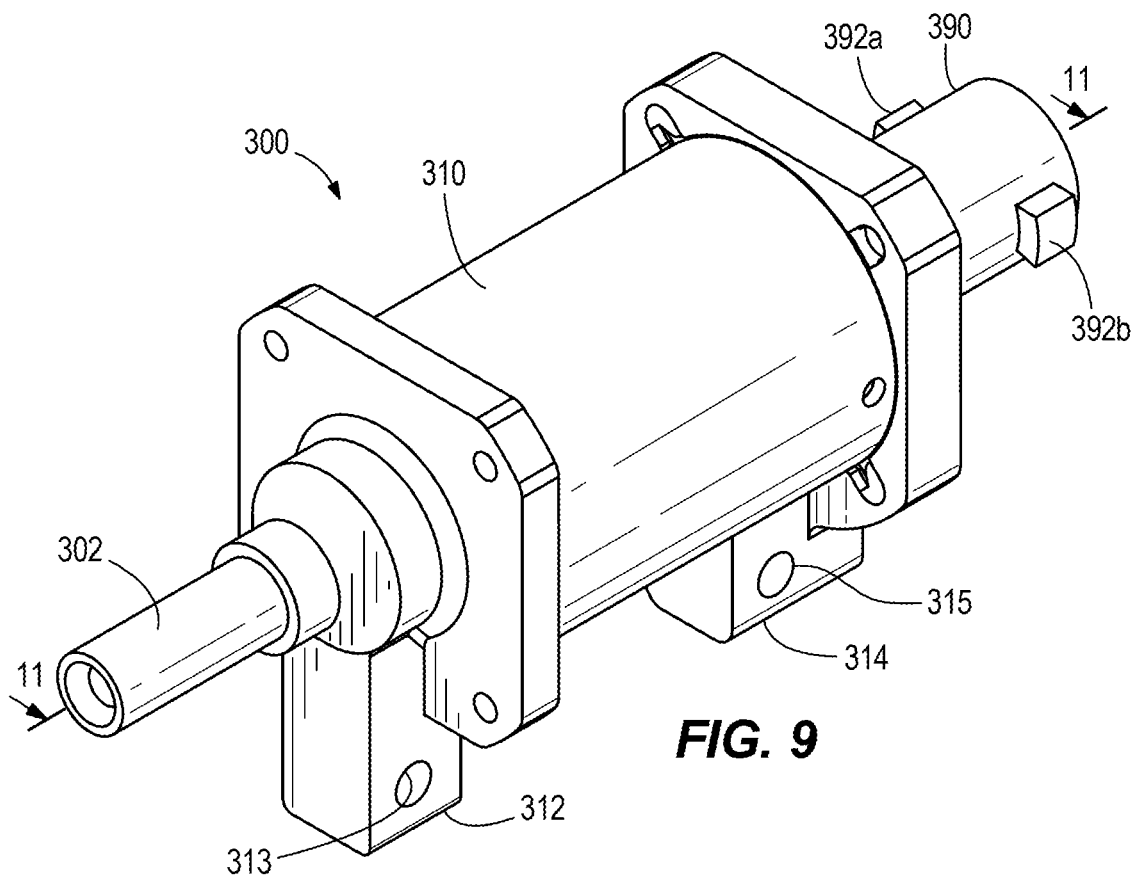
FIG. 9 is a perspective view of one example of a valve that may be used with or included in a liquid applicator assembly.
Figure 10:
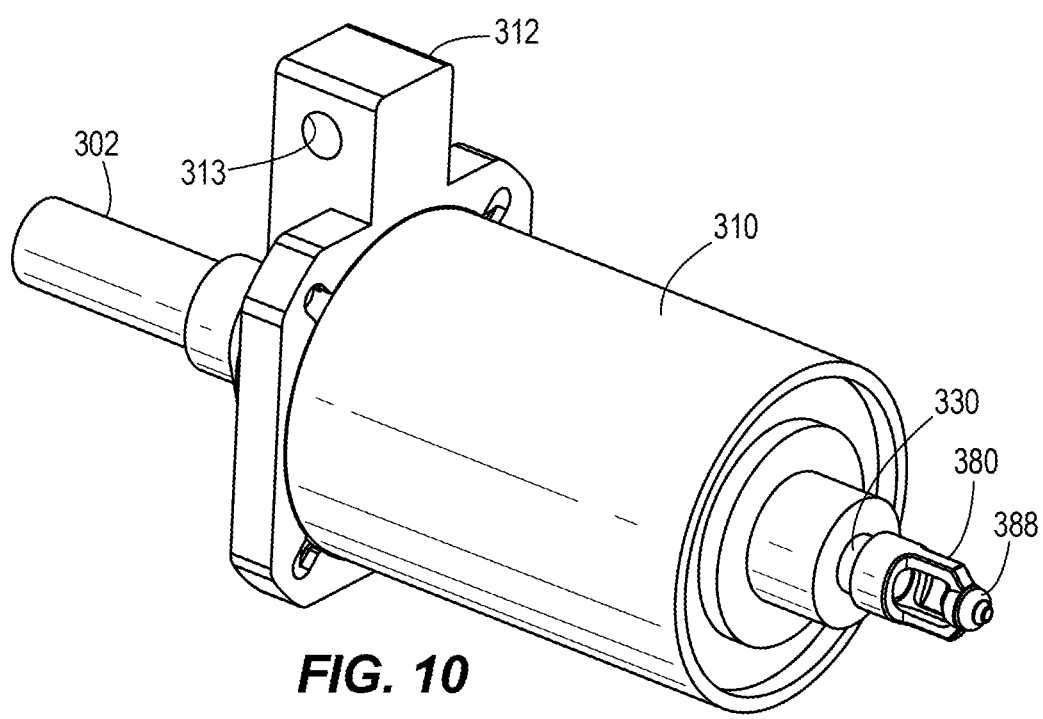
FIG. 10 is a perspective view of the valve of FIG. 9 with an end cap thereof not shown in order to illustrate certain components.

Referring to FIGS. 1 and 8, in some examples the applicator assembly 100 comprises a housing 110. In some examples, the housing 110 comprises two or more housing portions 118 such as a first portion 118-1 and second portion 118-2. The housing portions are optionally removably attached to one another.

In FIG. 8, first housing portion 118-1 is not shown in order to reveal certain optional components of the applicator assembly 100. The applicator assembly 100 optionally includes a valve 300 such as an on-off valve or flow control valve. The valve 300 is optionally mounted directly or indirectly to the housing 110. The valve 300 is optionally in fluid communication with a fluid source (e.g., container and/or pump which may be supported on the planter or the tractor) via a conduit 182.

In some examples, the valve 300 is oriented such that an outlet 390 thereof is disposed to deposit fluid generally along a direction Af (see FIG. 7) toward the seed furrow (e.g., the bottom of the seed furrow). In other examples, one or more liquid distributors such as spray nozzles or tubes may be mounted to the outlet 390 for directing fluid flow to locations in or adjacent to the seed furrow, such as by attaching such a distributor to the outlet 390 using one or more attachment tabs 392 (e.g., 392a, 392b).

In some examples, a seed firmer 112 is mounted to the housing 110. The seed firmer 112 is optionally configured to resiliently contact the seed furrow (e.g., the bottom of the seed furrow) in order to press seeds against and/or into the soil. The firmer 112 optionally includes one or more attachment points for attaching one or more liquid distribution tubes (not shown) therethrough. The liquid distribution tubes may be used to distribute liquid into the furrow and may be in fluid communication with the valve 300.

With continued reference to FIG. 8, a flow meter 530 is optionally also in fluid communication with the conduit 182 for measuring a flow rate of fluid passing through conduit 182 and/or valve 300. The flow meter 530 is optionally mounted directly or indirectly to the housing 110.

The applicator 100 optionally includes a fluid control system 500 comprising a controller 510 (e.g., circuit board, processor, memory, and/or etc.). The controller 510 is optionally mounted to housing 110 or may be mounted elsewhere. The controller 510 is optionally in communication (e.g., electrical communication, data communication, etc.) with one or more monitors or controllers which may be mounted on the row unit, on the toolbar, in the tractor cab, or elsewhere. In some examples, communication between controller 510 and other components is enabled by a harness 184 which may include multiple connectors (e.g., power connector, CAN connector, electrical connector, etc.). In some examples, the controller 510 is in communication (e.g., data communication, electrical communication, etc.) with the flow meter 530 (e.g., for receiving flow measurement signals therefrom). In some examples, the controller 510 is in communication (e.g., data communication, electrical communication, etc.) with the valve 300 (e.g., for sending command signals thereto such as commands to open or close the valve). In some examples, a seed sensor 520 is supported on the housing 110 and disposed to detect passage of seeds from the seed tube 240 (e.g., seeds crossing an axis As along which a light or other wave is sent by the seed sensor 520). The seed sensor 520 is optionally in communication (e.g., electrical communication, data communication, etc.) with the controller 510.

Figure 15:
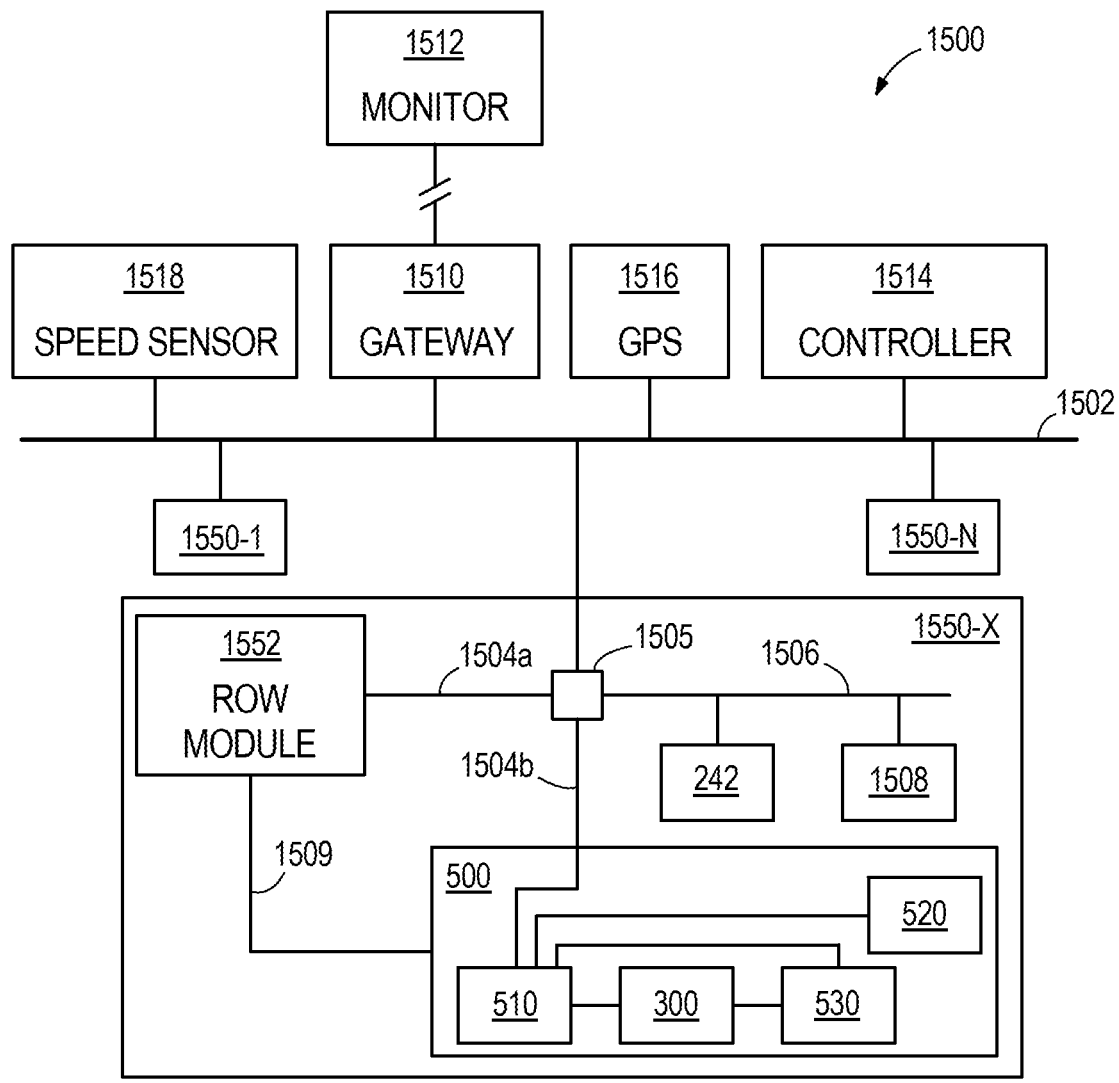
FIG. 15 schematically illustrates one example of a control system.

One example of a planter control system 1500 including control system 500 is schematically illustrated in FIG. 15. A controller 1514 (e.g., having a processor, memory, and/or graphical user interface) is optionally in data communication with an implement data bus 1502 (e.g., CAN bus). A gateway 1510 is also optionally in communication with the bus 1502; the gateway 1510 optionally communicates (e.g., wirelessly) with a monitor 1512 which may comprise monitoring software operating on a consumer computing device (e.g., tablet, smartphone, etc.). The monitor 1512 and controller 1514 are optionally disposed in a cab of a tractor.

A GPS receiver 1516 and speed sensor 1518 (e.g., radar speed sensor, etc.) are also optionally in data communication with the monitor and/or controller (e.g., via the bus 1502).

A plurality of row control systems 1550-1 through 1550-N are optionally in data communication with the bus 1502. Each row control system 1550-X is optionally associated with a single planter row unit and optionally includes one or more (e.g., all) components supported on the associated row unit.

Each row control system 1550-X optionally includes a row data bus 1506 for data connection to various row unit components such as seed sensor 242, seed meter drive 1508, and other components not shown (e.g., row unit downforce actuator, seed conveyor motor, etc.)

The row data bus 1506 is optionally in communication with a row module 1552 which optionally receives data and/or sends commands to the various row unit components on the row data bus. The row data bus 1506 also optionally receives commands and/or data (e.g., speed, GPS location, commanded planting population, commanded fertilizer rate, etc.) from the implement data bus 1502. The control system 500 is optionally in data communication with the row module 1552 via one or more harnesses 1504 and/or one or more connectors 1505. One or more of the harnesses 1504a, 1504b or connectors 1505 may also connect the row module 1552 to the row data bus 1506.

In some examples, the control system 500 includes the controller 510, which is optionally in data communication with the row module 1552, row data bus 1506, and/or implement data bus 1502. The controller 510 is optionally in data communication with the valve 300. The controller 510 is optionally in data communication with the seed sensor 520. In some examples, the seed sensor 520 is supported separately from the seed tube 240 (e.g., on the housing 110). In some examples, the seed sensor 520 optionally comprises an acoustic sensor but may also comprise an optical sensor or electromagnetic sensor in other examples. The controller 510 is optionally in data communication with flow meter 530. Various components of the control system 500 optionally receive power from the row module 1552 via harnesses 1504 and/or via one or more separate electrical connections 1509.

In operation, in some examples, the controller 510 receives a liquid application rate command from the controller 1514 and/or monitor 1512 (e.g., via the row data bus 1502 and/or the row module 1552). The controller 510 optionally determines an appropriate valve command to command to the valve 300 in order to establish the commanded liquid application rate. The controller 510 optionally receives a flow rate measurement signal from the flow meter 530 and optionally adjusts the valve command to bring the flow rate measurement signal closer to the signal corresponding to the commanded liquid application rate. The controller 510 optionally reports the flow rate measurement signal to the controller 1514 and/or monitor 1512 (e.g., via the implement data bus 1502 and/or the row module 1552).

In operation, in some examples, the controller 510 receives seed position information from seed sensor 242 and/or seed sensor 520 and determines a valve command in order to obtain a predetermined liquid placement relative to one or more seeds (e.g., placement on the seed, placement near the seed, etc.).

In some examples, the controller 510 combines the seed position information from seed sensor 242 and seed sensor 520 in order to predict seed position. In one such example, the controller 510 receives seed pulses from seed sensor 242 and determines one or more expected time windows in which a seed should pass seed sensor 520 or the seed sensor 520 should observe a seed. The controller 510 optionally ignores seed pulses from sensor 520 outside of the determined time windows and uses the remaining "non-ignored" seed pulses to determine a position of the seed. The controller 510 optionally commands the valve 300 to open for selected period of time after a given time passes or a given distance is traveled by the row unit following a non-ignored seed pulse. In some examples, the sensor 520 and valve 300 are positioned and oriented such that opening the valve 300 immediately upon receiving a seed pulse from sensor 520 results in a desired placement of liquid relative to the seed (e.g., on the seed).

In some examples, the controller 510 selects the amount of time that the valve 300 is opened after receiving a seed pulse in order to bring the overall liquid application rate closer to the commanded or desired liquid application rate.

In some examples, the controller 510 uses the times of subsequent seed pulses received from sensors 242 and 520 in order to determine a seed velocity and predict a position of the seed relative to valve 300.

It should be appreciated that the control methods described herein with respect to sensor 242 could also be implemented with an electromagnetic sensor 244 or a seed sensor disposed to detect passage of a seed on a seed conveyor 262.

Valve Examples

As described above, the valve 300 may be of any configuration for selectively stopping fluid flow and/or modifying a flow rate or pressure of fluid flowing therethrough. However, referring to FIGS. 9-14, one example of a valve 300 is illustrated in more detail.

Figure 11:
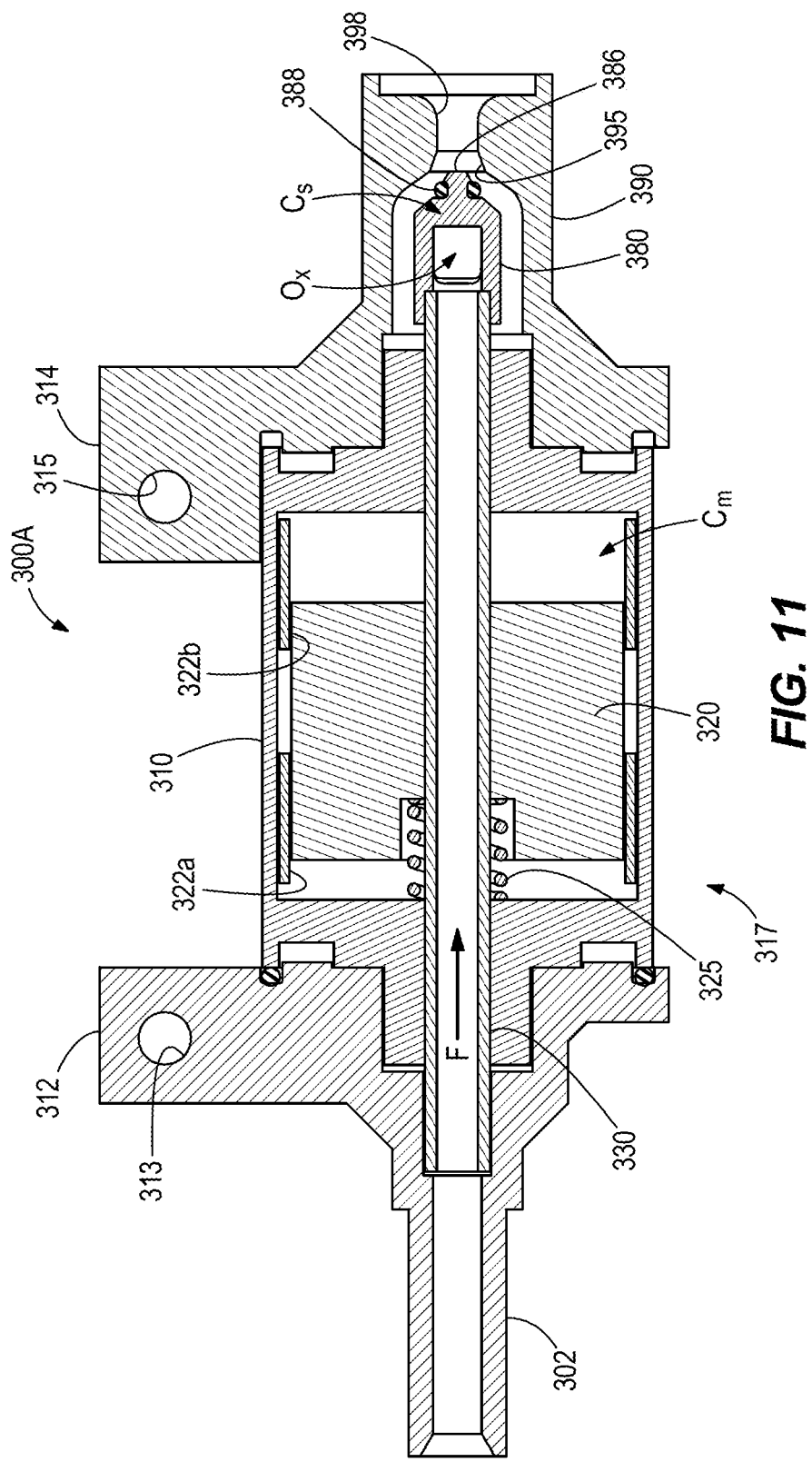
FIG. 11 is a cross-sectional view of the valve taken along line 11-11 in FIG. 9 in an open position or open configuration.
Figure 12:
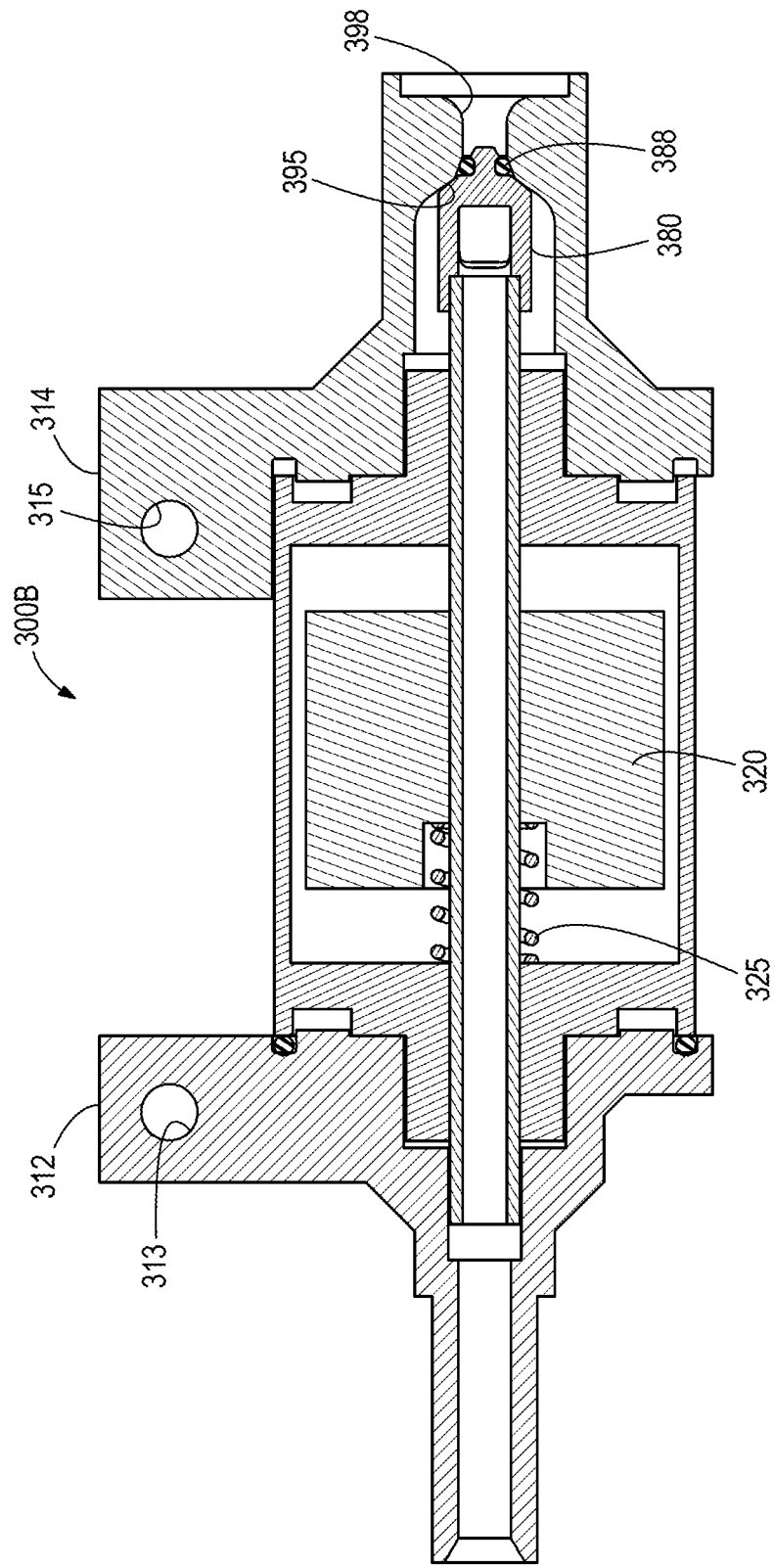
FIG. 12 is a cross-sectional view of the valve of FIG. 9 in a closed position or closed configuration.

The valve 300 optionally includes an inlet 302 in fluid communication with a fluid source as described above. Referring to FIG. 11, the inlet 302 is optionally in fluid communication with a first end of a conduit 330 (e.g., tube) which optionally extends at least partially through a housing or valve body 310. The valve body 310 is optionally mounted to supports 312, 314. The supports 312, 314 optionally include mounting holes 313, 315, respectively for attaching the valve to a support surface (e.g., to the housing 110). The conduit 330 optionally extends through a magnet chamber Cm. A second end of the conduit 330 is optionally in fluid communication with an outlet chamber Cs. A stopper 380 is optionally mounted to the second end of the conduit 330. In a closed configuration of the valve 300, the stopper 380 optionally prevents fluid flow from exiting the outlet chamber Cs via an outlet opening 398. In some examples, the stopper 380 includes a seal 388 which may be supported on a tip 386 of the stopper 380. In some examples, in the closed configuration the stopper 380 presses the seal 388 against a surface 395 (e.g., annular surface) of the stopper chamber Cs such that fluid is substantially or completely prevented from passing from the stopper chamber Cs through the outlet opening 398. One example of a closed position or closed configuration of the valve 300 is shown in FIG. 12. In some examples, in the open configuration the seal 388 is displaced from the surface 395, permitting fluid to flow to the outlet opening 398. One example of an open position or open configuration of the valve 300 is shown in FIG. 11. A gap or space is clearly seen between the seal 388 and the surface 395 in the open position or open configuration.

In some examples, the valve 300 comprises an actuator 317 (e.g., voice coil actuator, electrically-operated actuator, etc.—see e.g., FIG. 11) for changing an operating state of (e.g., opening and closing) the valve 300. In some examples, the valve 300 includes an actuator 317 that comprises and/or includes common features or functionality with Model No. DDLM-038-051-01 available from Moticont in Van Nuys, Calif. In some examples, the actuator 317 (e.g., voice coil actuator) is capable of cycling (e.g., between positions or configurations of a magnet and/or of the valve 300) in a frequency range of over 30 hertz (e.g., over 40 hertz, between 30 and 50 hertz, between 40 and 50 hertz).

Referring to FIG. 11, a magnet 320 is optionally mounted to the conduit 330 and disposed inside magnet chamber Cm. The magnet 320 is optionally movable between first and second positions (e.g., in order to reconfigure the valve 300 from the closed configuration to the open configuration— two positions of magnet 320 shown in FIGS. 11 and 12 to respectively correspond to the open and closed positions of valve 300). In some examples, the magnet 320 is displaced between the first and second positions by selectively alternately imposing a current through one of two electrical coils 322a, 322b. It should be appreciated that in the illustrated example, axial displacement (e.g., from left to right as viewed in FIG. 11) of magnet 320 axially displaces both conduit 330 and/or stopper 380. A biasing member 325 (e.g., compression spring, etc.) is optionally disposed to bias the magnet 320 into its first position in which the valve 300 is optionally in its closed configuration.

Figures 13, 14:
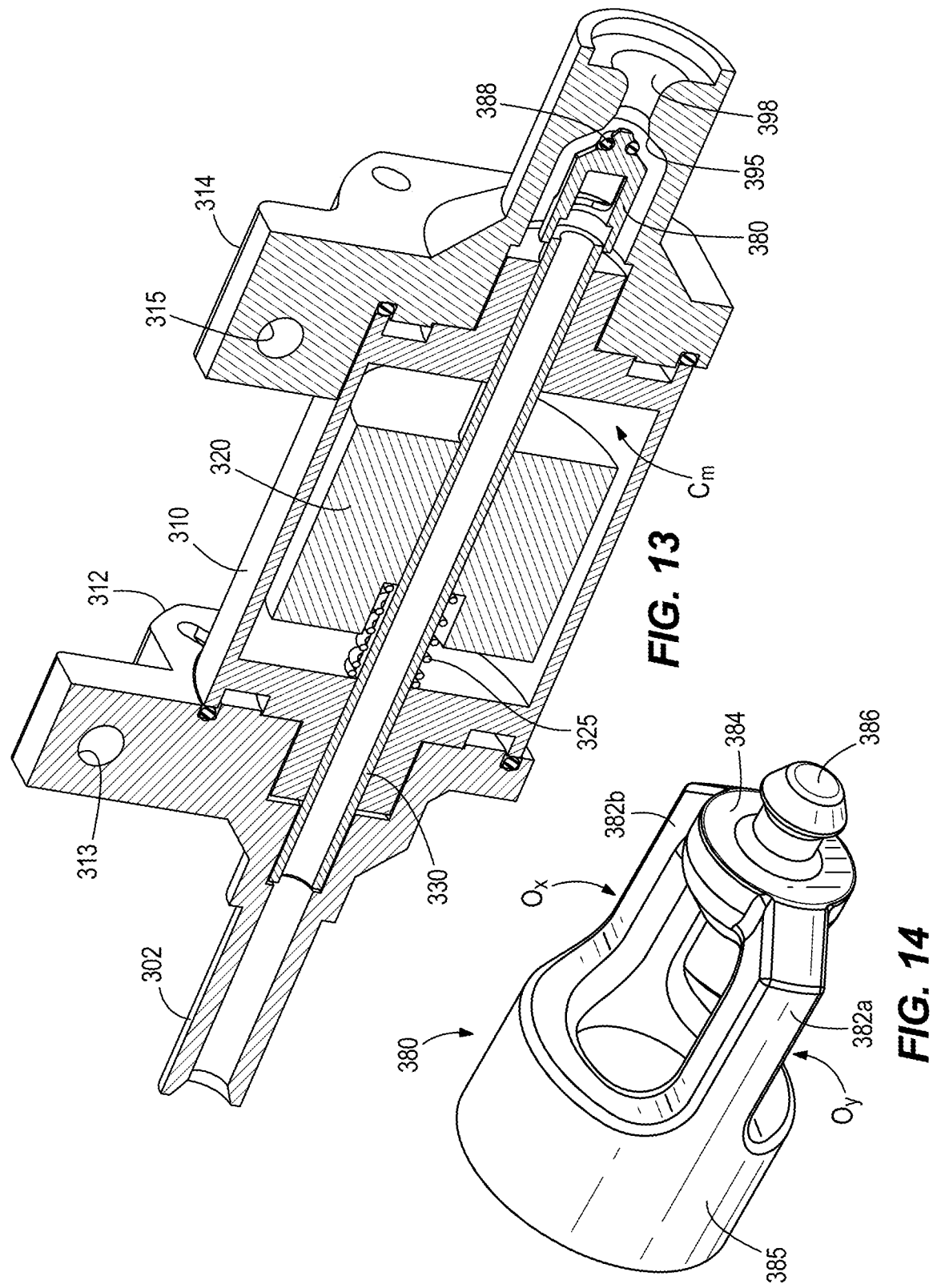
FIG. 13 is a perspective sectional view of the valve of FIG. 9 in an open position or open configuration.
FIG. 14 is a perspective view of one example of a valve stopper of the valve of FIG. 9.

Referring to FIG. 14, one example of the stopper 380 is shown in more detail. The stopper 380 optionally includes a mounting ring 385 which is optionally coupled to the conduit 330. The stopper 380 optionally includes a seal holder 384 having a tip 386 thereon for securing the seal 388 (e.g., o-ring—not shown in FIG. 14 to illustrate seal space between seal holder and tip) in place. One or more support arms (e.g., support arms 382a, 382b) are optionally coupled to both seal holder 384 and mounting ring 385. One or more openings (e.g., openings Ox and Oy) permit fluid to flow through the stopper 380 (e.g., from the conduit 330).

In one example of a description of operation of the valve 300, fluid initially flows through inlet 302 into the first end of conduit 330, generally along the direction F (see FIG. 11). Fluid then flows out of the second end of conduit 330. Fluid then flows out of the openings Ox, Oy in the stopper 380. In the closed configuration, fluid pressure optionally accumulates in the stopper chamber Cs and optionally tends to bias the seal 388 against the surface 395. A command signal (e.g., electrical current) is optionally used to displace magnet 320 into its second position such that the valve 300 reconfigures into its open configuration. In the open configuration, fluid flows from the stopper chamber Cs around seal 388 and out of the outlet opening 398.

Referring to FIGS. 27-34, another example of a valve 300" is illustrated. The valve 300" selectively stops and allows fluid flow and/or modifies a flow rate or pressure of fluid flowing there through.

The valve 300" may be connected anywhere in a row unit for controlling the flow of liquid therefrom to be applied to soil at any time prior to, during, or subsequent to the planting process. In one example, the valve 300" may be coupled to a planter row unit. In another example, the valve 300" may be coupled to any other agricultural device.

Figure 27:
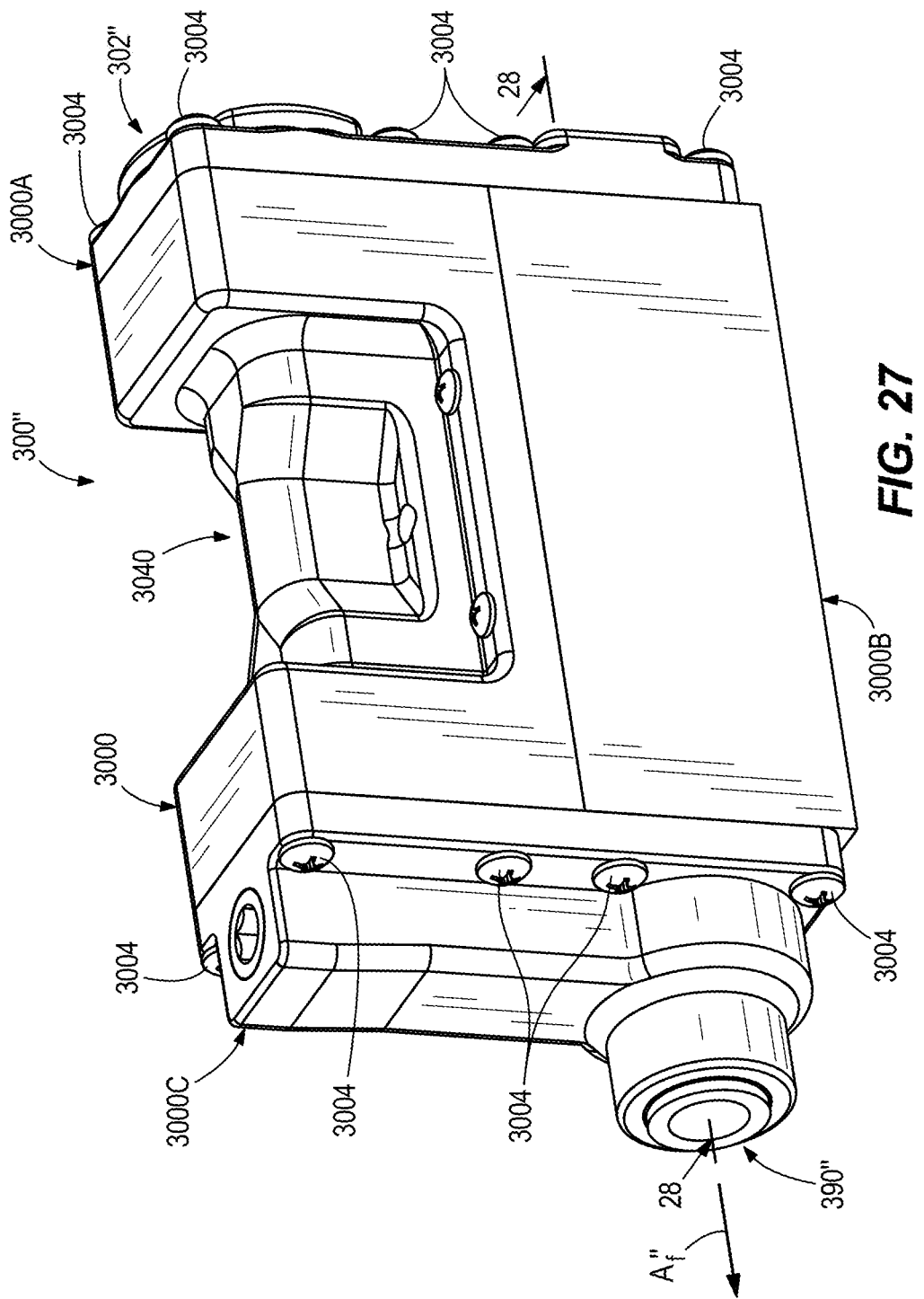
FIG. 27 is a perspective view of one example of a valve that may be used with or included in a liquid applicator assembly.
Figure 28:
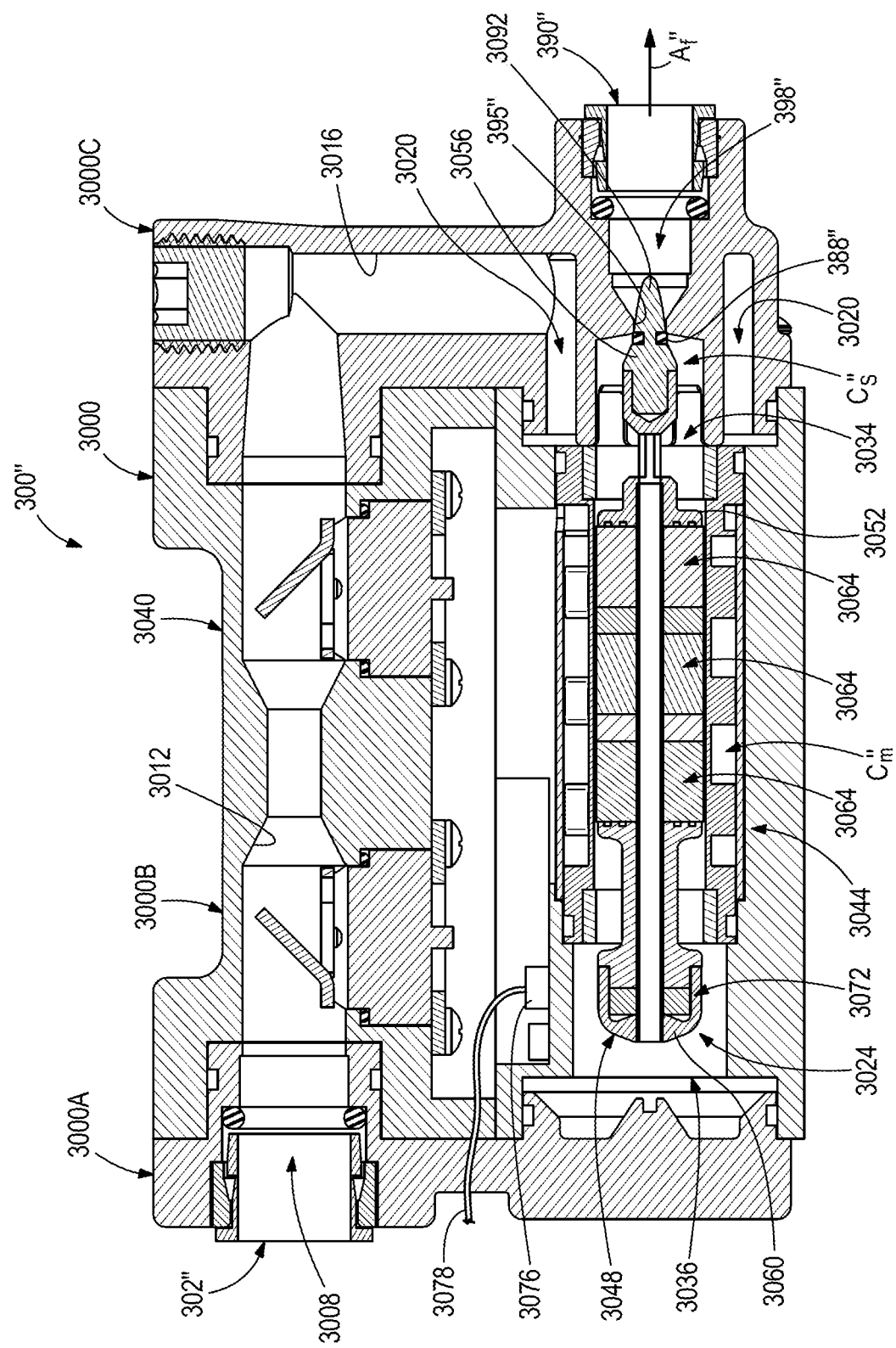
FIG. 28 is a cross-sectional view taken along line 28-28 in FIG. 27.

With particular reference to FIGS. 27 and 28, the valve 300" includes a housing 3000 optionally comprising of, for example, three housing portions. In one example, the housing portions include an inlet housing portion 3000A, a medial housing portion 3000B, and an outlet housing portion 3000C. The three housing portions may be coupled together in any manner. In one example, the three housing portions are optionally fastened together by fasteners 3004 (e.g., bolts, screws, etc.). In other examples, the housing 3000 may include any number of portions including a single unitarily-formed housing. The valve 300" optionally includes an inlet 302" in fluid communication with a fluid source as described above. The valve 300" also defines a liquid flow path or conduit 3008 through the housing 3000 (described in more detail hereinafter) and exits the housing 3000 through an outlet 390".

The conduit 3008 extending through the housing 3000 may have any configuration and be within the intended spirit and scope of the present disclosure. One example of the path or conduit will be described herein with reference to FIGS. 27-34. In one example, the inlet 302" of the valve 300" is in fluid communication with a first conduit 3012 extending longitudinally through one side or portion of the housing 3000. The first conduit 3012 is in fluid communication with a second conduit 3016 extending generally perpendicular to the first conduit 3012. The second conduit 3016 is in fluid communication with a first fluid chamber 3020. The first fluid chamber 3020 is in fluid communication with a plunger chamber 3024 and a plurality of pressure chambers 3028. In one example, the valve 300" includes four pressure chambers 3028. In other examples, the valve 300" may include any number of pressure chambers including, none, one, or more. A plurality of openings 3032 are defined between the first chamber 3020 and the plunger chamber 3024 to allow fluid to pass from the first chamber 3020 into a first end 3034 of the plunger chamber 3024. The valve 300" may include any number of openings 3032. The pressure chambers 3028 allow fluid to pass into a second end 3036 of the plunger chamber 3024. The combination of pressure chambers 3028 and openings 3032 facilitate an acceptable pressure range within the valve 300". The plunger chamber 3024 is in fluid communication with an outlet chamber Cs", which is in fluid communication with the outlet 390". The valve 300" is oriented such that an outlet 390" thereof is disposed to deposit fluid generally along a direction Af" (e.g., toward a bottom of the seed furrow or a separate trench or furrow adjacent the seed furrow—see FIGS. 27 and 28). In other examples, one or more liquid distributors such as spray nozzles or tubes may be mounted to the outlet 390" for directing fluid flow to locations in or adjacent to the seed furrow.

In one example, the valve 300" includes a flow rate meter 3040. In one example, the flow rate meter 3040 is disposed inside the housing 3000. The flow rate meter 3040 may be disposed in a variety of locations within the housing 3000. In one example, the flow rate meter 3040 is associated with the first conduit 3012 in that fluid flowing through the first conduit 3012 passes through the flow rate meter 3040. The valve 300" may include a wide variety of flow rate meters and all of such possibilities are intended to be within the spirit and scope of the present disclosure. In one example, the flow rate meter is an ultrasonic flow rate meter 3040.

With continued reference to FIGS. 27-34, in one example, the valve 300" includes an actuator 3044 (e.g., voice coil actuator, electrically-operated actuator, electro-magnetically controlled actuator, etc.) for changing an operating state of (e.g., opening and closing) the valve 300". In one example, the actuator 3044 is capable of controlling the valve 300" to have an infinite number of positions and conditions, whereas conventional solenoid valves may only have a fully-opened position and a fully-closed position. The actuator 3044 may control the valve 300" between a fully closed position and numerous opening positions to provide variable rate liquid flow through the valve 300". In one example, the valve 300" includes a plunger 3048 within the plunger chamber 3024. In one example, the plunger 3048 includes a body 3052, a head or stopper 3056, and a tail 3060. The plunger 3048 optionally includes a plurality of actuator magnets 3064 disposed in/on/as part of the body 3052. The plunger 3048 is capable of including any number of actuator magnets 3064 and the actuator magnets 3064 may be disposed anywhere along and/or within the plunger 3048. The plunger 3048 and plunger chamber 3024 optionally extend through a magnet chamber Cm". The magnet chamber Cm" encircles the plunger chamber 3024 and is fluidly isolated from the plunger chamber 3024 to prevent liquid from passing from the plunger chamber 3024 to the magnet chamber Cm". One or more electrical coils 3068 (see FIGS. 30 and 31) are positioned in and wrap within the magnet chamber Cm". The actuator magnets 3064, and therefore the plunger 3048, are moved by selectively imposing current through the one or more electrical coils 3068. Intensity of the electrical current may optionally determine the extent to which the actuator magnets 3064, and therefore the plunger 3048, are moved.

Electrical current may be alternately imposed through the actuator coils 3068, thereby moving the actuator magnets 3064, and therefore the plunger 3048, in alternate directions (e.g., axial displacement from left to right as viewed in FIG. 28).

In one example, the valve 300" optionally determines the displacement or position of the plunger 3048. In one example, a displacement magnet 3072 is included in the tail 3060 of the plunger 3048. A displacement sensor 3076, electrically connected to the system and controller via a wired or wireless coupling (e.g., wired connection 2078), is included in the valve 300" to determine the position of the displacement magnet 3072, and therefore the position of the plunger 3048. The information associated with the position of the plunger 3048 can be used by the system to provide more refined control of the liquid flow through the valve 300". The displacement magnet 3072 may be positioned anywhere along/in/on the plunger 3048 and the associated displacement sensor 3076 may be disposed anywhere in the housing 3000 of the valve 300" or externally of the valve 300". In other examples, the position of the plunger 3048 may be determined in other manners and all of such manners are intended to be within the spirit and scope of the present disclosure.

Figure 34:
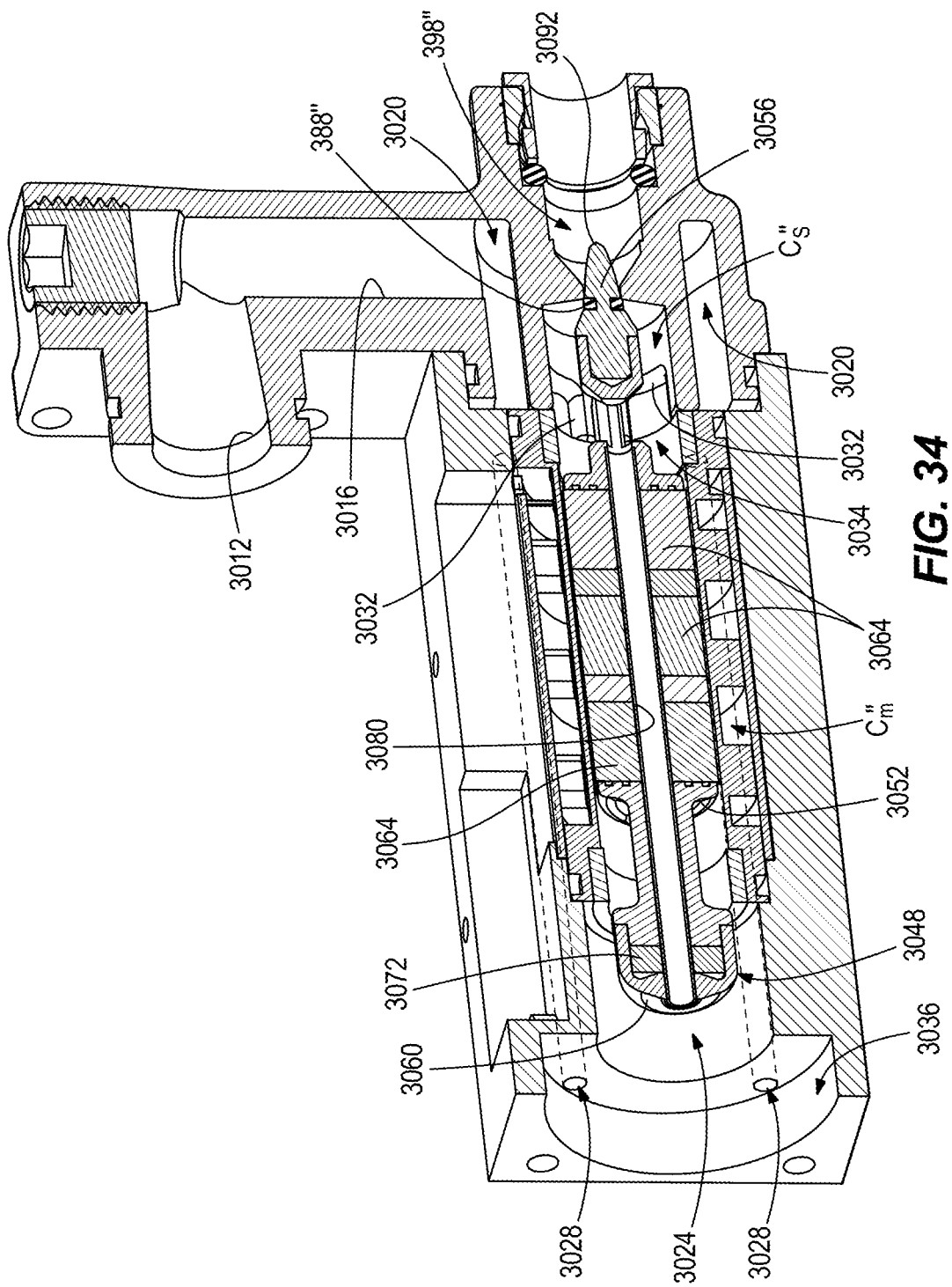
FIG. 34 is a cross-sectional view taken along line 28-28 in FIG. 27 of a portion of the valve of FIG. 27 with a portion of the valve shown transparent to illustrated features of the valve.

With further reference to FIGS. 27-34, in one example, a plunger conduit 3080 is defined longitudinally through the tail 3060 and body 3052 of the plunger 3048. The plunger 3048 optionally includes a plurality of spaced-apart support members 3084 (see FIG. 29) connecting the head 3056 to the body 3052 with openings 3088 (see FIG. 28) between the support members 3084 in fluid communication with the plunger conduit 3080. The combination of plunger conduit 3080 and openings 3088 between the support members 3084 allow fluid to flow in either direction through the plunger conduit 3080 from end to end of the plunger chamber 3024. With particular reference to FIG. 34, the plunger conduit 3080 in combination with the pressure chambers 3028 allow fluid to flow in either direction through the plunger conduit 3080 and the pressure chambers 3028. This multi-directional flow of the fluid is determined based on whether the valve 300" is closed or opened and to what extent of valve 300" is opened. Position of the plunger 3048 may cause a pressure difference within the valve 300" and, in one example, a pressure difference between the first and second ends of the plunger chamber 3024. The pressure difference may cause the fluid to flow from high pressure areas to low pressure areas. The plunger conduit 3080 and the pressure chambers 3028 inhibit a large pressure difference from being created within the valve 300", which allows the plunger 3048 to be moved with less force (and less energy).

Figure 29:
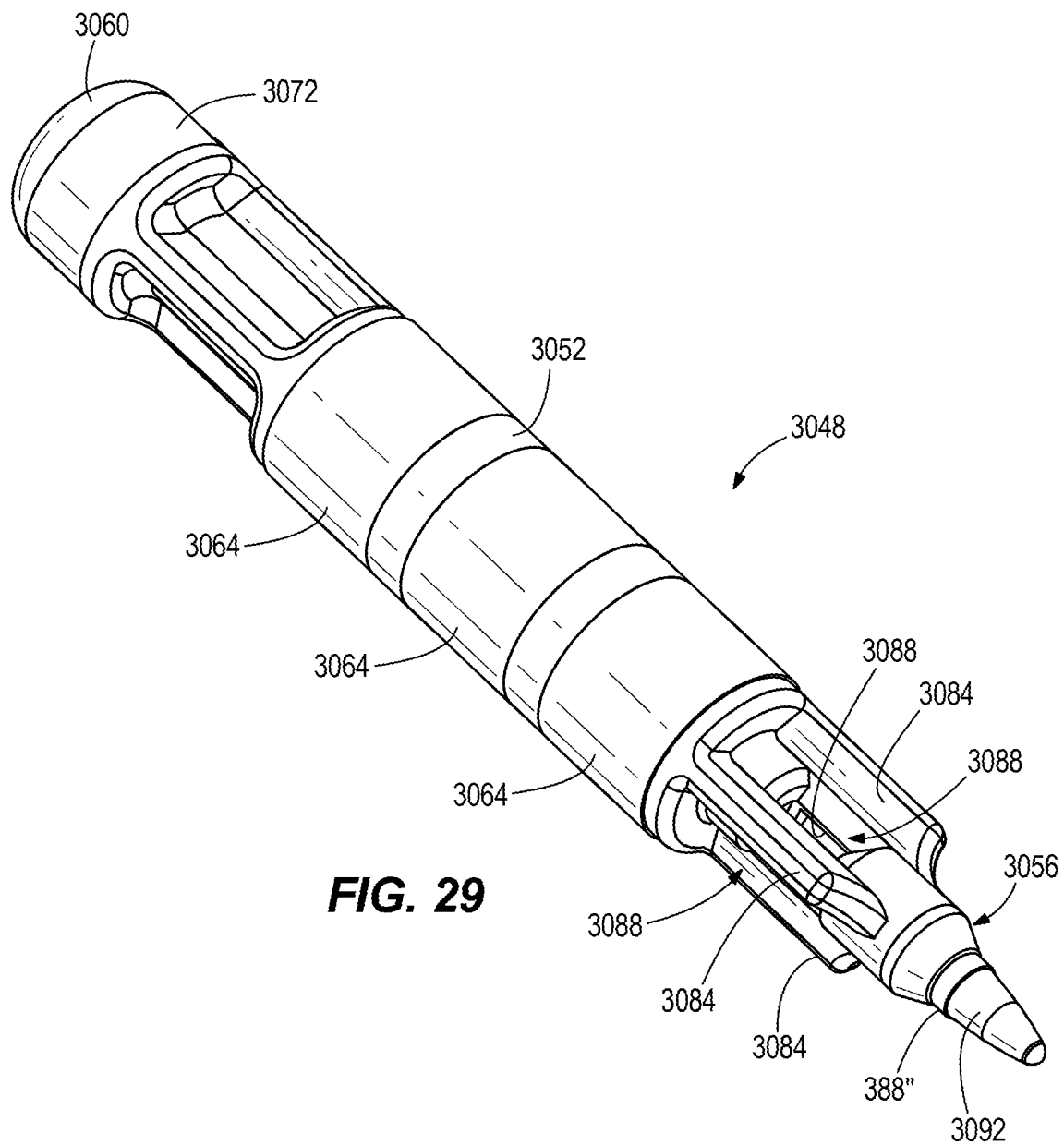
FIG. 29 is a perspective view of one example of a plunger included in the valve of FIG. 27.
Figure 30:
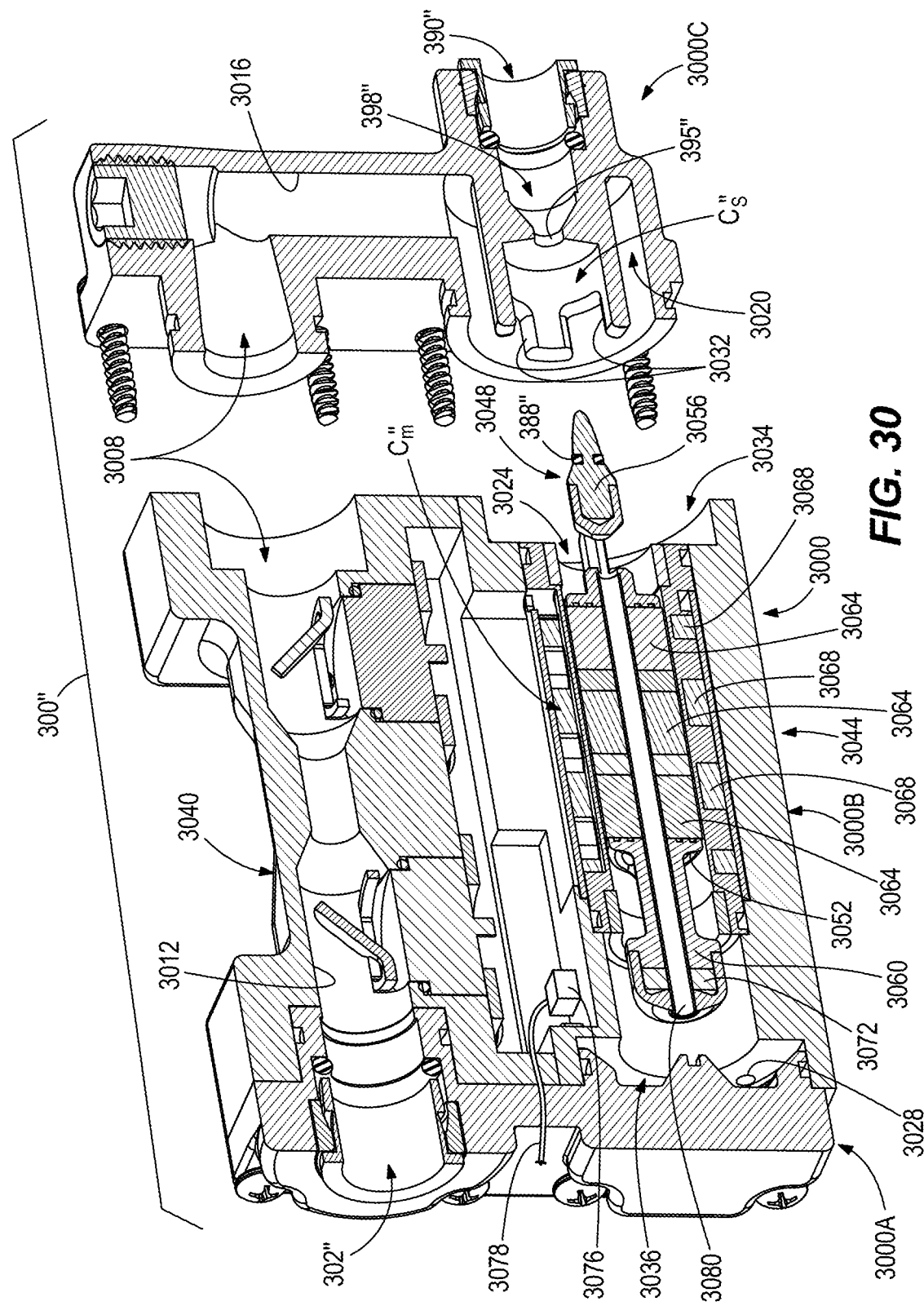
FIG. 30 is a cross-sectional view taken along line 28-28 in FIG. 27 shown in perspective and partially exploded.

Referring now to FIGS. 28 and 29, the head 3056 optionally prevents fluid flow from exiting the outlet chamber Cs" and flowing into the outlet opening 398". In some examples, the head 3056 includes a seal 388" which may be supported proximate a tip 3092 of the head 3056. In some examples, in the closed configuration the head 3056 presses the seal 388" against a surface 395" (e.g., annular surface) of the outlet chamber Cs" such that fluid is substantially or completely prevented from passing from the outlet chamber Cs" through the outlet opening 398". One example of a closed position or closed configuration of the valve 300" is shown in FIG. 28. In some examples, in any of the variety of open configurations, the seal 388" is displaced from the surface 395", permitting fluid to flow to the outlet opening 398". The various open configurations are defined by the distance the head 3056 and seal 388" are displaced from the surface 395". For example, the further the head 3056 and seal 388" are displaced from the surface 395", the more liquid that is allowed to flow through the valve 300" (i.e., higher flow rate). In other examples, the head 3056 may not include a separate seal. Rather, in these examples, the head 3056 itself may engage the surface 395" and prevent or substantially prevent fluid from exiting the outlet chamber Cs" and flowing into the outlet opening 398". In some examples, the head 3056 may be made of a material sufficient to provide the desired resiliency to create a proper seal to prevent liquid flow, but also be sufficiently rigid to withstand the forces applied thereto during actuation of the valve 300".

Figure 31:
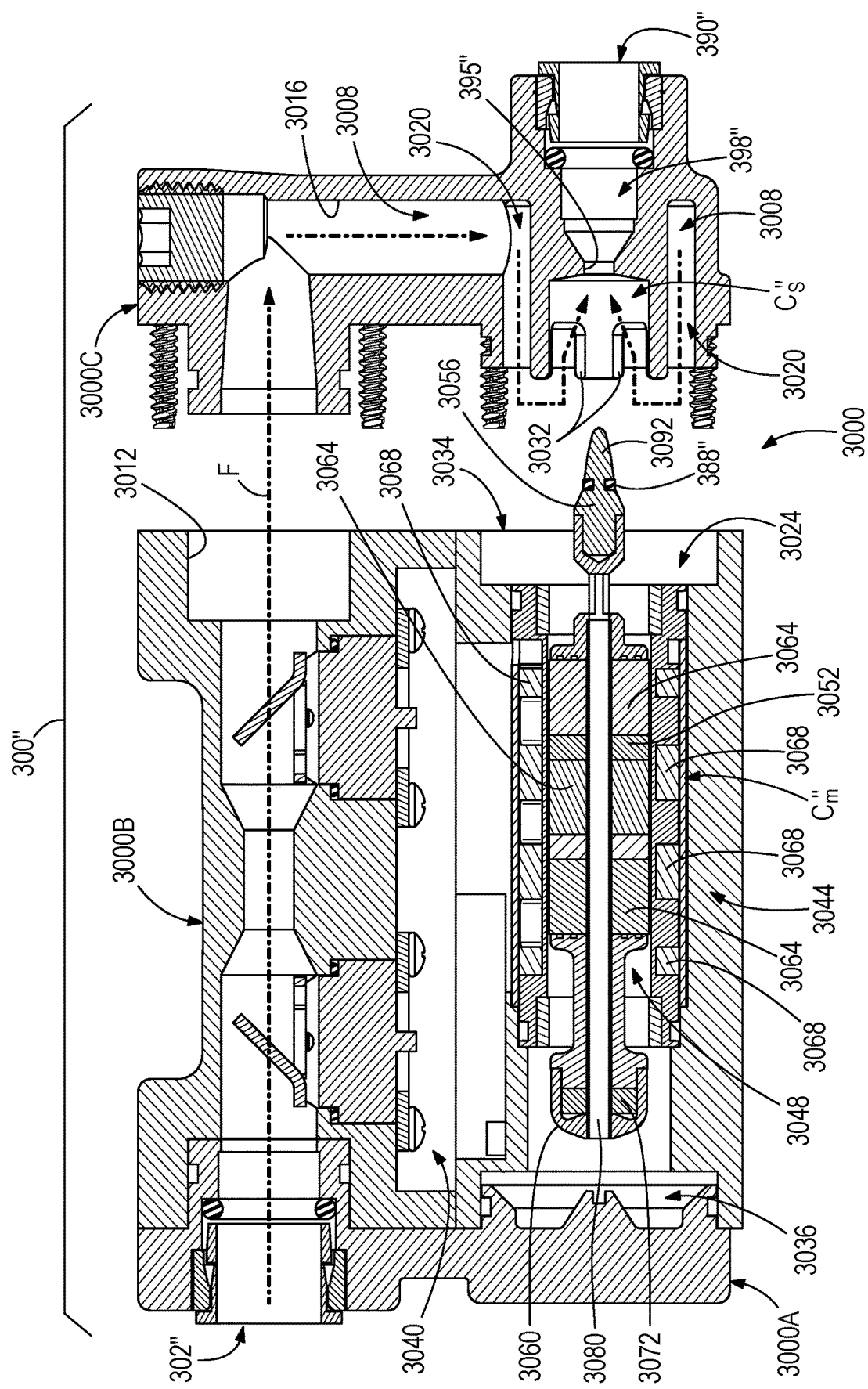
FIG. 31 is a cross-sectional view taken along line 28-28 in FIG. 27 shown partially exploded and one example of a fluid flow path through at least a portion of the valve of FIG. 27.
Figure 32:
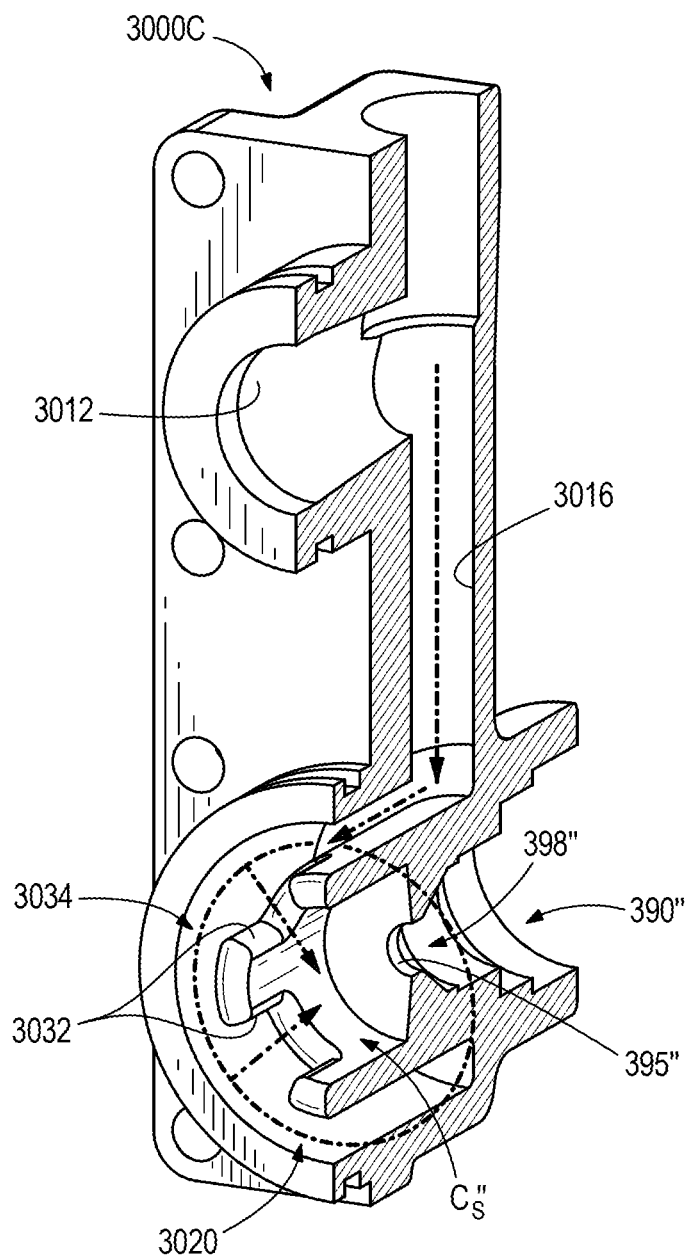
FIG. 32 is a cross-sectional view taken along line 28-28 in FIG. 27 of a portion of the valve of FIG. 27.
Figure 33:
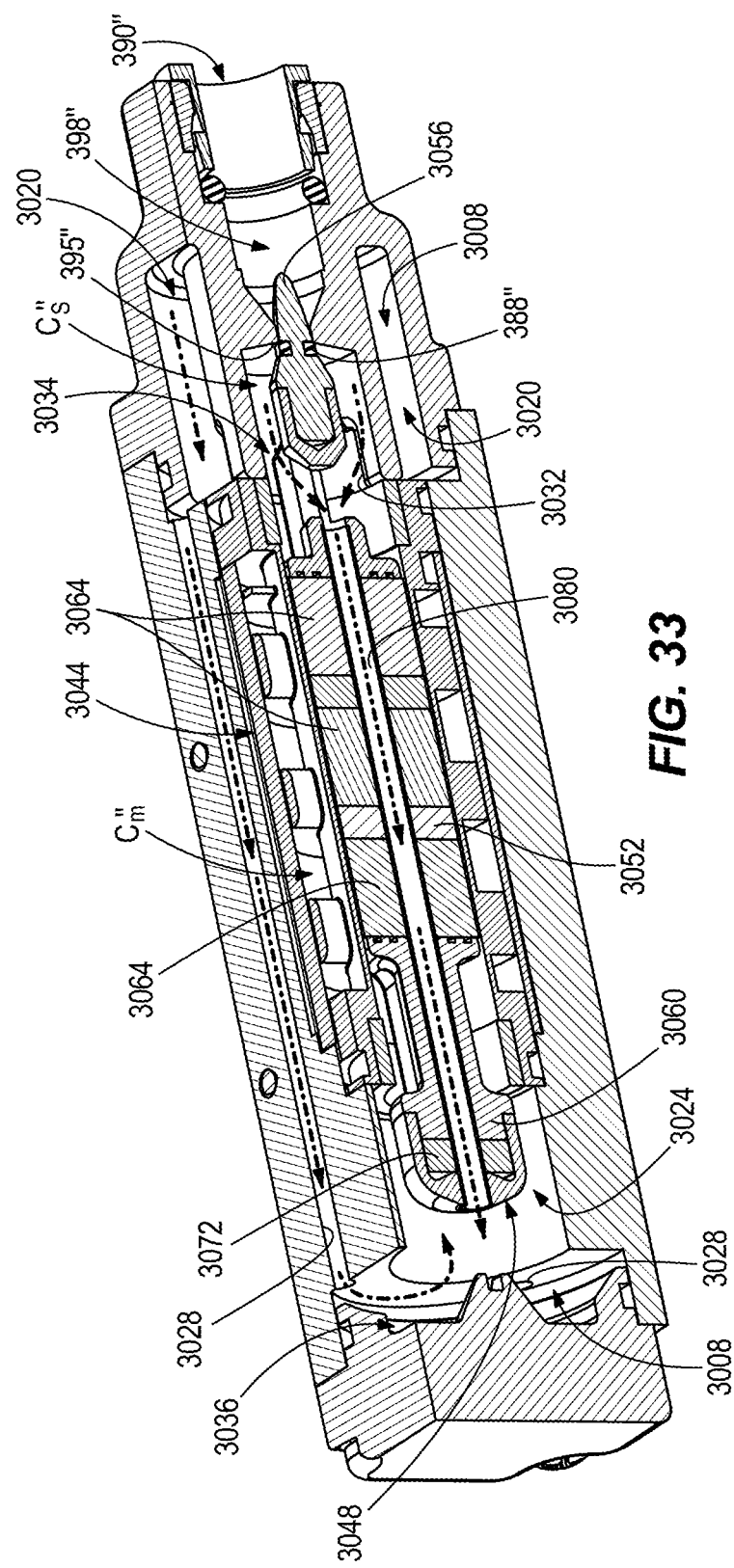
FIG. 33 is a cross-sectional view taken along line 28-28 in FIG. 27 of a portion of the valve of FIG. 27.

In one example of a description of operation of the valve 300", with particular reference to FIGS. 28 and 31-33, fluid initially flows through inlet 302" into the first conduit 3012, generally along the direction F (see FIG. 31). Fluid then flows out of the first conduit 3012 into the second conduit 3016. Fluid then flows out of the second conduit 3016 into the first chamber 3020. From the first chamber 3020, fluid may either flow into the plunger chamber 3024 via the openings 3032 or may flow into the pressure chambers 3028. Fluid flowing into the plunger chamber 3024 via the openings 3032 flow into the first end 3034 of the plunger chamber 3024 and into the outlet chamber Cs". Fluid flowing into the pressure chambers 3028 passes through the pressure chambers 3028 into the second end 3036 of the plunger chamber 3024. A command signal (e.g., electrical current) is optionally used to displace the actuator magnets 3064, and therefore the plunger 3048, into one of the open positions. Actuation of the plunger 3048 from a closed position to one of the open positions allows fluid to flow from the plunger chamber 3024, into the outlet chamber Cs", past the head 3056, and into the outlet opening 398". Fluid then flows from the outlet opening 398" to the outlet 398" where the fluid exits the valve 300".

Figure 16:
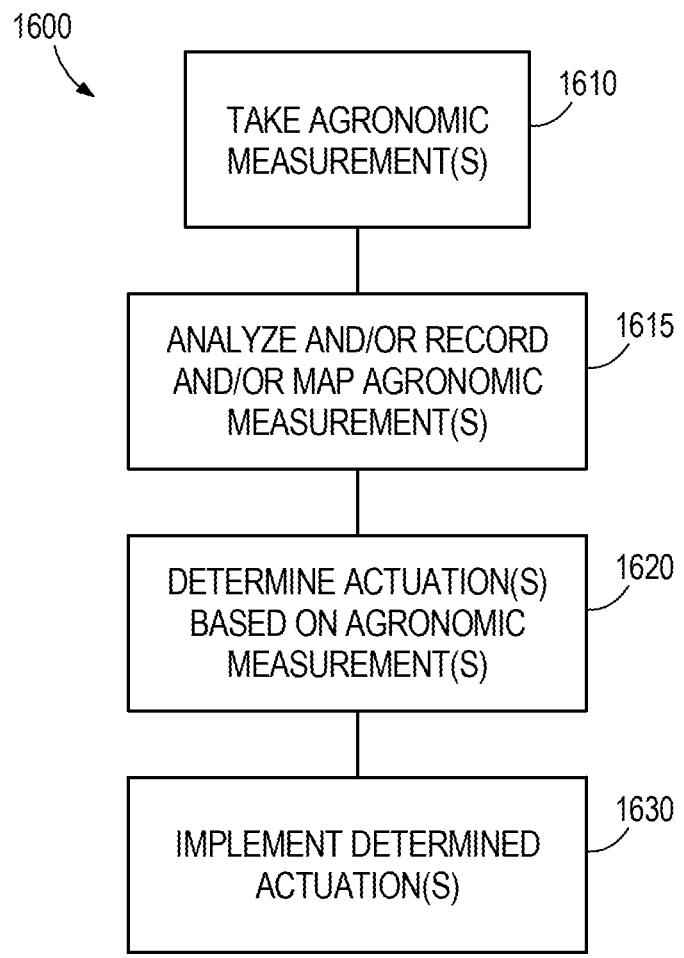
FIG. 16 schematically illustrates one example of a method for agronomic measurement and/or actuation.

Referring to FIG. 16, one example of a method 1600 for monitoring agronomic measurements and/or controlling or actuating components of an implement (e.g., planter row unit) is illustrated. The method 1600 may be implemented using the system 500, the system 1700 described below (or other system examples) and optionally one or more additional actuators and an associated controller or controllers. At step 1610, the system optionally takes one or more agronomic measurements in or adjacent to the seed furrow (e.g., measures residue presence or amount such as by using a camera, reflectivity sensor, optical sensor or other sensor; detects soil temperature; measures soil moisture; detects seed presence such as by using a camera, reflectivity sensor, optical sensor or other sensor; measures soil color; detects organic matter; detects seed color; detects seed orientation; etc.). At step 1615, the system optionally analyzes, records, and/or creates a geo-referenced map of the agronomic measurement or measurements made at step 1610. At step 1620, the system optionally determines one or more actuations (e.g., appropriate actuation, desired actuation, recommended actuation, etc.) based at least in part on the one or more agronomic measurements made at step 1610. For example, the system may carry out one or more of the following actuations: controlling one or more liquid application valves (e.g., for application of any one or more of the following or a mixture thereof: water, fertilizer, biological, insecticide, fungicide, etc.) such as closing, opening or modifying an application rate of the one or more valves 300 or modifying a product mixture to be applied by the valves 300; retracting, extending, or modifying a setting (e.g., downpressure, position, angle, aggressiveness, etc.) of a row cleaner, closing wheel, row unit downforce cylinder, or other actuator; controlling a seed metering criteria (e.g., modifying a seeding rate, seed type, etc.).

In various examples of the method 1600, the system performs one or more of the following actions: detects an amount of residue and adjusts a row cleaner setting (e.g., downpressure, position, angle, aggressiveness, etc.) based on the amount of residue; detects an amount of residue and adjusts a liquid application valve setting based on the amount of residue; detects a soil moisture and adjusts a liquid application valve setting based on the soil moisture level; detects one or more seeds and adjusts a liquid application valve setting based on the seed position or spacing; detects a soil color and adjusts a liquid application valve setting based on the soil color; detects an organic matter level and adjusts a liquid application valve setting based on the organic matter level; detects a seed color and adjusts a liquid application valve setting (e.g., by identifying based on the seed color that a seed is a refuge seed and applying a different liquid prescription, such as a rate or mixture, to the refuge seed than to a non-refuge seed); detects a seed orientation (e.g., aligned with the trench or normal to the trench, etc.) and adjusts a liquid application valve setting. It should be appreciated that in various examples, any measurement disclosed herein may be used to adjust any criterion or setting described herein based on the measurement or information derived from the measurement.

Figure 17:
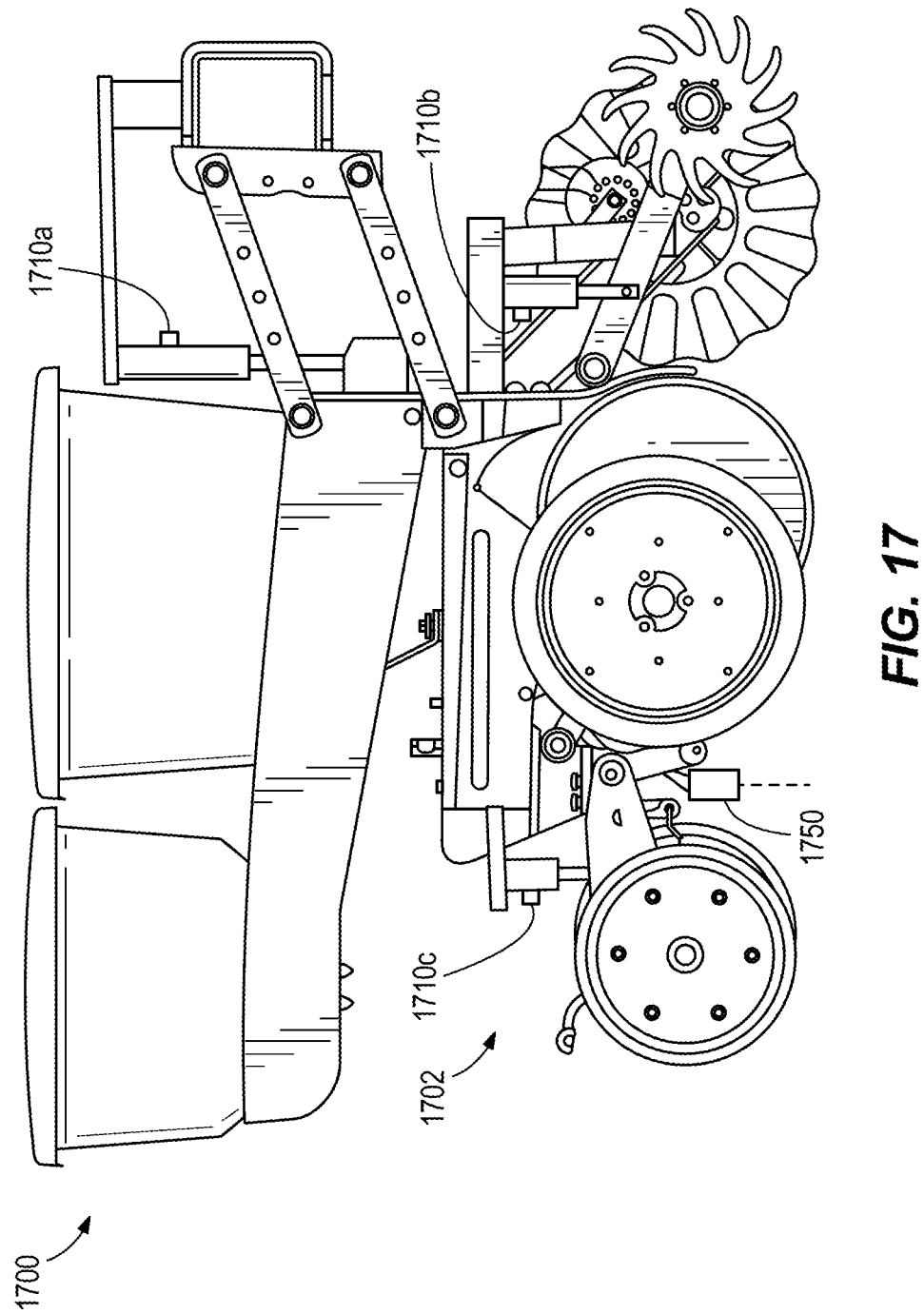
FIG. 17 is a side elevation view of one example of a row unit including one example of a at least a portion of a control and monitoring system.
Figure 18:
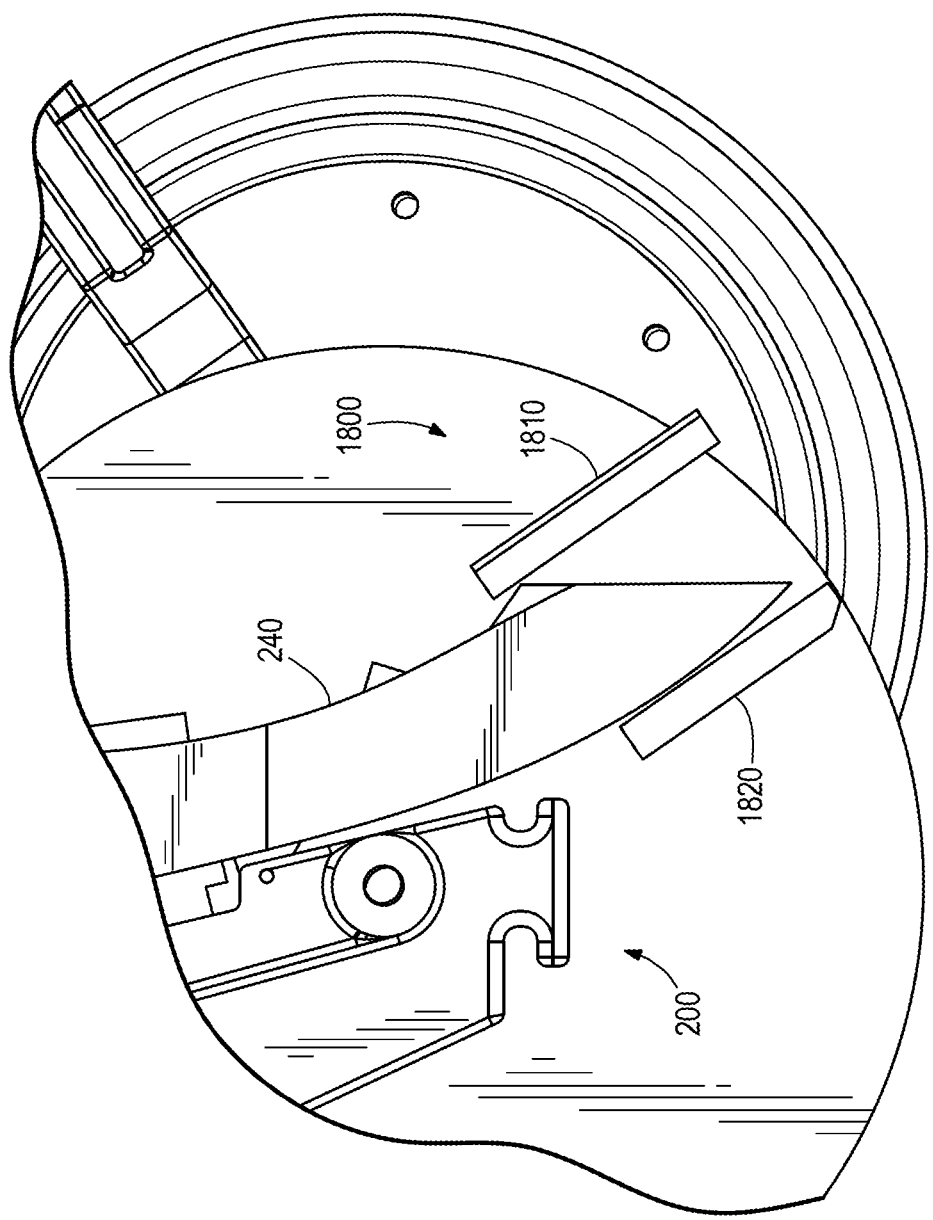
FIG. 18 is a side elevation view of one example of a seed sensor assembly.
Figure 19:
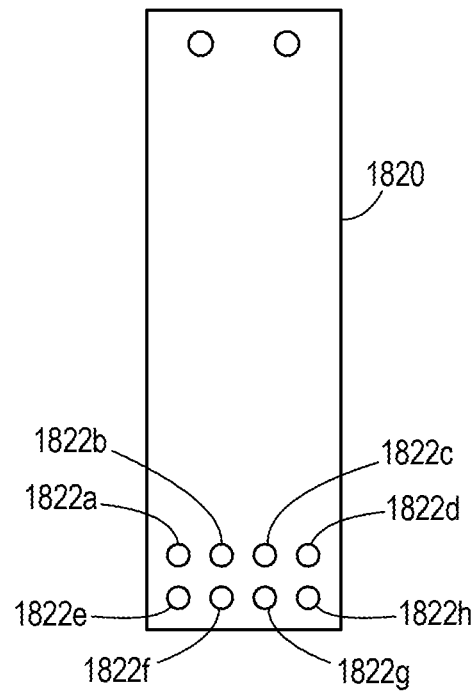
FIG. 19 is a plan view of one example of an emitter of the seed sensor assembly of FIG. 18.
Figure 20:
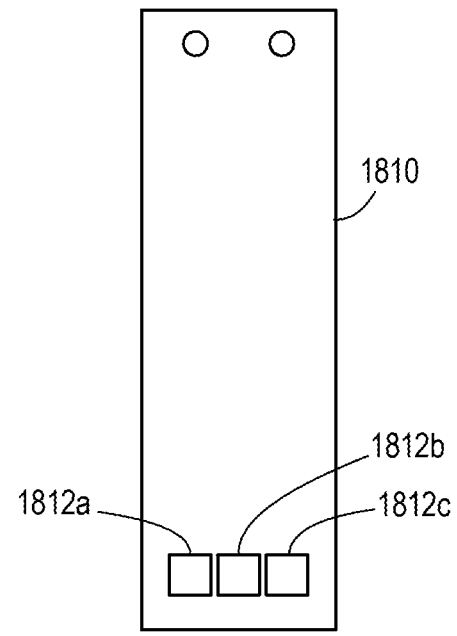
FIG. 20 is a plan view of one example of a receiver of the seed sensor assembly of FIG. 18.
Figure 21:
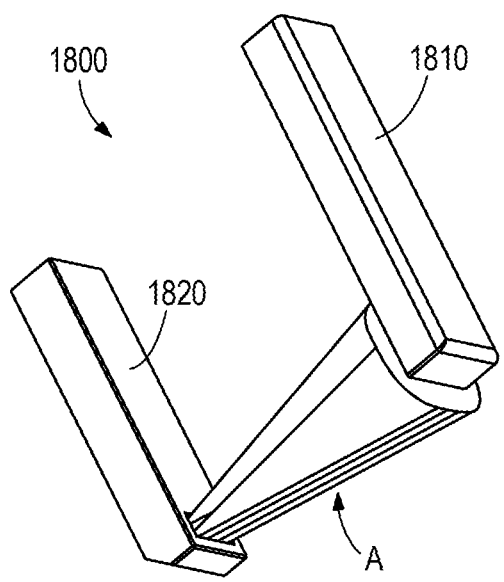
FIG. 21 is a perspective view of the seed sensor assembly of FIG. 18 illustrating one example of a light transmission pattern.
Figure 22:
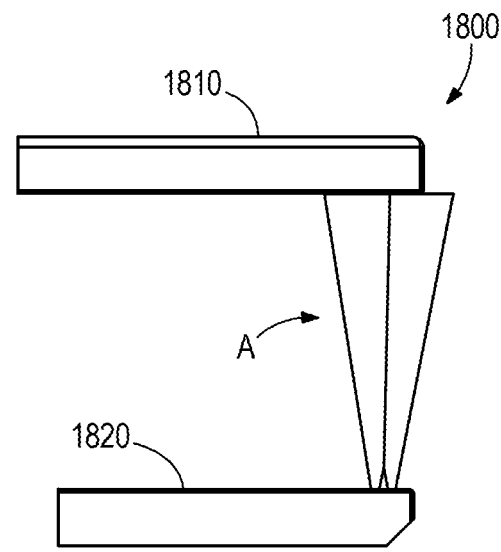
FIG. 22 is a side elevation view of the seed sensor assembly of FIG. 18 illustrating one example of a light transmission pattern.

Referring to FIG. 17, an example of a system 1700 is schematically illustrated which may be used to implement the method 1600. The system 1700 is shown operably supported on a row unit 1702. The system 1700 optionally comprises the system 1500 and optionally comprises one or more actuators in addition to the valve 300. For example, one or more position control actuators or downforce control valves 1710a, 1710b, 1710c may be included for controlling a setting (e.g., downpressure, position, angle, aggressiveness, etc.) of the row unit, row cleaners and closing wheels, respectively. The valves 1710 are optionally in data communication with the monitor 1512 and/or the controller 1514. The system 1700 optionally comprises one or more sensor 1750 (e.g., optical sensor, reflectivity sensor, camera, electromagnetic sensor, etc.). The sensor 1750 is optionally in data communication with the monitor 1512 and/or the controller 1514. The sensor 1750 is optionally disposed to measure a criterion associated with the seed furrow or an area adjacent to the seed furrow (for example, the sensor 1750 is optionally disposed above the seed furrow and is optionally directly or indirectly supported on either a shank or a seed tube of the row unit).

In some examples, one or more liquid control valves (e.g., similar to or the same as valve 300) may be used to carry out a process of varying crop input applications (e.g., rate, mixture, spray pattern, product type, etc.) during a post-planting input application (e.g., sprayer application, side-dress application, etc.) based on the output of one or more sensors (e.g., crop spacing sensors, crop spacing consistency sensors, contact sensors, greenness index sensor, organic matter sensors, soil color sensors, etc.). One or more such sensors may be disposed on (e.g., at a lower end of) a sprayer drop assembly (e.g., disposed between rows of standing crop) such as one or more embodiments described in U.S. Pat. No. 9,167,745, incorporated herein by reference. In some examples, the one or more valves 300 may be removed from the planter and used in the post-planting application.

Turning to FIGS. 18-22, an example of a seed sensor assembly 1800 is illustrated. The assembly 1800 optionally comprises an optical sensor but may comprise an acoustic, magnetic or other sensor in some examples. The assembly 1800 may be used in place of or in addition to the seed sensors described herein with respect to various system examples. The seed sensor assembly 1800 is optionally supported past the terminal end of a seed tube 240 by a bracket (not shown) or adjacent structure. The assembly 1800 optionally includes an emitter 1820 (e.g., comprising a circuit board) and a receiver 1810 (e.g., comprising a circuit board). The emitter 1820 optionally includes a plurality of emitter elements 1822 (e.g., optical emitters such as light-emitting diodes, etc.) which may be arranged in a grid arrangement (e.g., a 2-by-4 grid arrangement as illustrated or other arrangements). The receiver 1810 optionally includes a plurality of receiver elements 1812 (e.g., photodiodes, phototransistors, etc.) which are optionally generally aligned with the arrangement of emitter elements as illustrated. The receiver 1810 is optionally in data communication with a monitor or controller of any of the system examples described herein for communicating seed presence information. Seeds passing through an area A between the receiver elements and emitter elements optionally interrupt light transmission between the emitter 1820 and receiver 1810. In examples in which the receiver elements produce a signal (e.g., current) that is proportional to light obstruction (e.g., received light intensity), the monitor optionally determines whether a seed has passed the assembly 1800 based in part on whether one or more receiver element signals has crossed a signal threshold (e.g., minimum current, maximum current, etc.) associated with the passage of a seed (e.g., if the signal changes but does not cross the signal threshold, the signal change may be ignored or otherwise not counted as a seed). In examples including a plurality of receiver elements, the monitor optionally determines whether a seed has passed the assembly 1800 based at least in part on the change in receiver element signals from the plurality of receiver elements (e.g., an obstruction affecting only one receiver element signal may be ignored and/or not counted as a seed, etc.).

Figure 23:
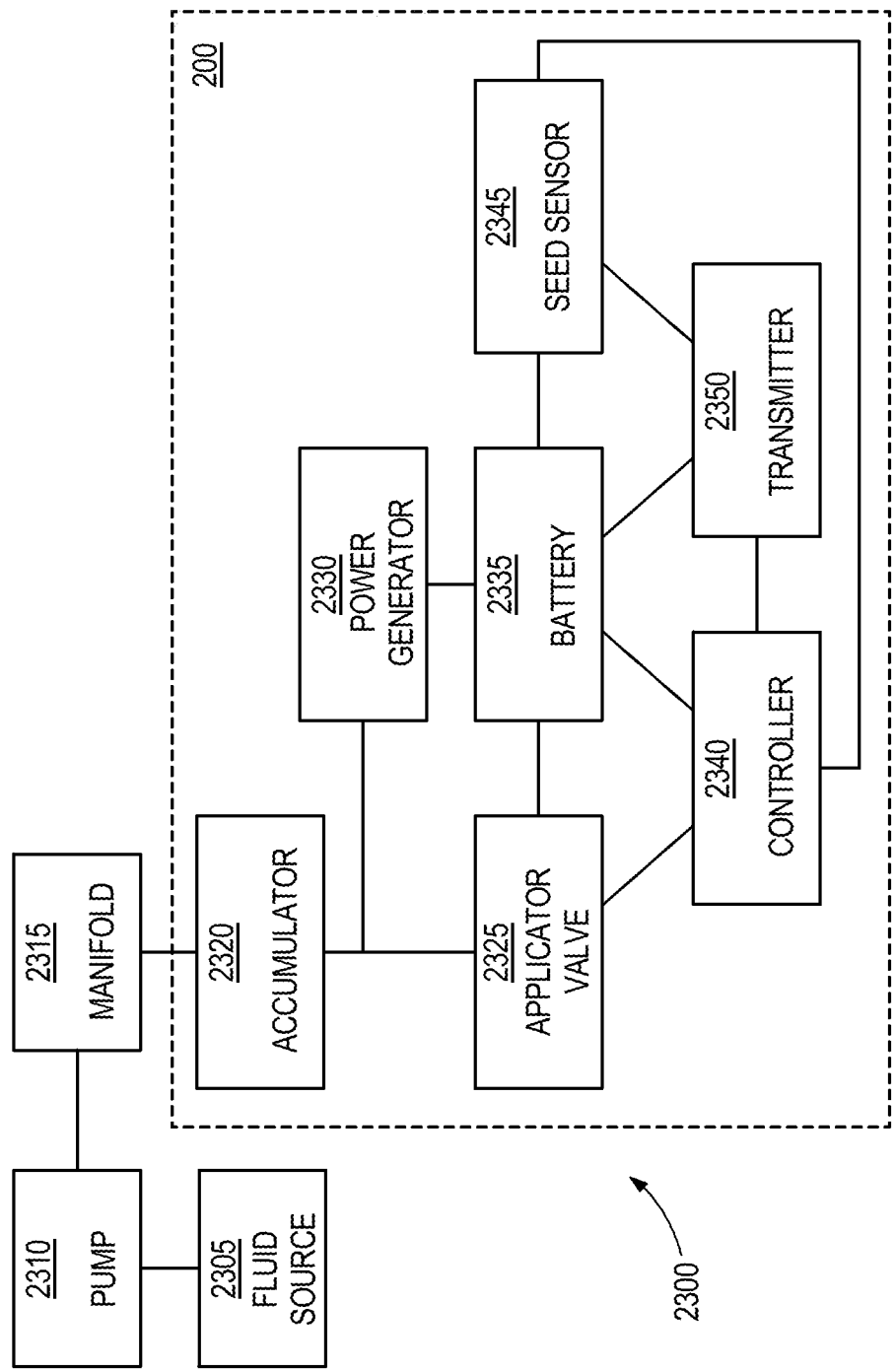
FIG. 23 schematically illustrates one example of a liquid control system.

Turning to FIG. 23, one example of a control system 2300 is illustrated optionally having a power generator 2330 in fluid communication with a fluid source 2305 (e.g., a container containing a one or more crop inputs such as fertilizer, water, insecticide, herbicide, biological, etc.). The power generator 2330 is optionally powered by movement of fluid from the fluid source 2305. The power generator 2330 optionally charges a battery 2335 or other power source for powering various functions of an implement such as a planter row unit or monitoring and a control system therefor as described below.

Continuing to refer to FIG. 23, the control system 2300 optionally includes a pump 2310 in fluid communication with the fluid source 2305. The pump 2310 is optionally in fluid communication with and optionally pumps fluid to a manifold 2315. The manifold 2315 optionally distributes fluid to a plurality of row units 200 (or sections or groups of row units in some examples). The manifold 2315 is optionally in fluid communication with one or more applicator valves 2325 (e.g., one at each row unit or one for each group or section of row units) which may be similar to the valve 300 or other applicator valve examples described herein. The manifold 2315 is optionally in fluid communication with one or more of the valves 2325 via an accumulator 2320. The manifold 2315 is optionally in fluid communication with one or more power generators 2330 (e.g., a paddlewheel, turbine, or other element which is driven for rotation or other movement by flow or pressure fluid, e.g., of the fluid transmitted from the fluid source 2305). The power generator 2330 optionally charges (e.g., may be in electrical communication with) a battery 2335 or other power storage device. The battery 2335 optionally is in electrical communication with and optionally powers one or more of a controller 2340 (e.g., for controlling a state of the applicator valve 2325), a seed sensor 2345 (e.g., in data communication with the controller 2340), and a transmitter 2350 (e.g., a wireless transmitter for transmitting data from the seed sensor and/or controller to a central monitor and/or controller on the planter or in a tractor cab). In various examples, the power generator may be upstream of the accumulator and/or in series or in parallel with the accumulator.

Figure 24:
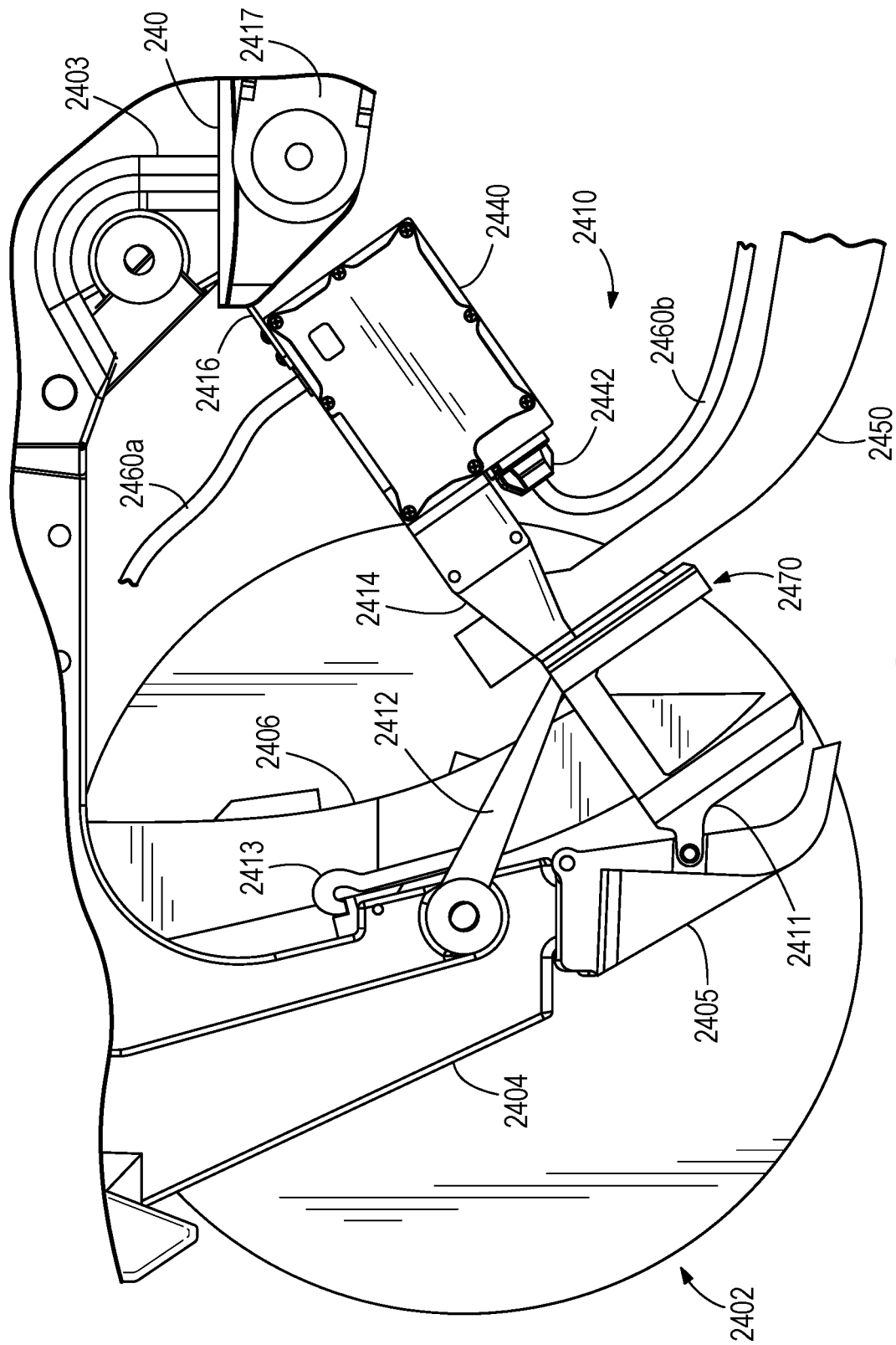
FIG. 24 is a left side elevation view of one example of a mounting assembly.

Referring to FIG. 24, one example of a mounting assembly 2410 is shown supported on a row unit 2402. The mounting assembly 2410 optionally includes one or more brackets 2412 extending to the side of a seed tube 2406 and mounted to a shank 2404 of the row unit. The brackets 2412 are optionally bolted to the sides of the shank 2404 and/or engaged to the shank 2404 by one or more hooks 2413. In some examples, the brackets 2412 may be omitted. The mounting assembly 2410 optionally includes one or more brackets 2411 mounted to a bayonet 2405 of the row unit. The mounting assembly 2410 optionally includes a medial portion 2414 which optionally supports a seed firmer 2450 or other planter attachment. The mounting assembly 2410 optionally includes a rear bracket 2416 mounted to a row unit subframe 2403 and/or a closing wheel support 240 of the row unit. The mounting assembly 2410 optionally supports a seed sensor assembly 2470. The seed sensor assembly 2470 may comprise or have common features and/or functionality with one of the seed sensor assemblies described herein. The seed sensor assembly 2470 is optionally supported below and/or past a terminal end of the seed tube 2406. The seed sensor assembly 2470 is optionally supported separately from the seed tube 2406. The mounting assembly 2410 optionally supports a liquid control system 2440 optionally including a control valve 2442. The control system 2440 may comprise or have common features and/or functionality with one of the control system assemblies described herein. Fluid is optionally supplied to the valve 2442 via a conduit 2460*a*. The valve 2442 is optionally in fluid communication with a conduit 2460*b*. The conduit 2460*b* is optionally supported on the seed firmer 2450 (or other attachment). An outlet of conduit 2460*b* is optionally positioned behind or adjacent to the seed firmer 2450 and is optionally aligned with the seed furrow opened by the row unit 2402.

Figure 25:
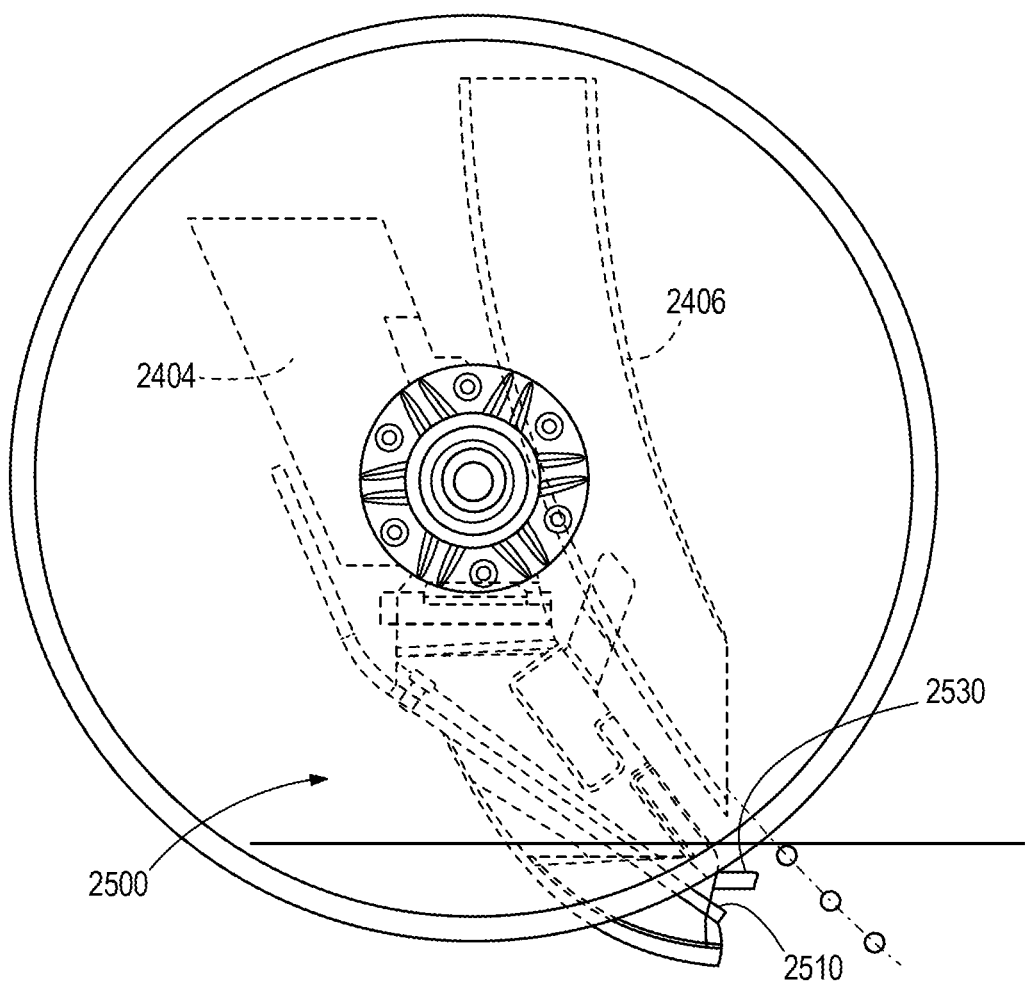
FIG. 25 is a side elevation view of one example of a seed tube guard sensor and application assembly.
Figure 26:
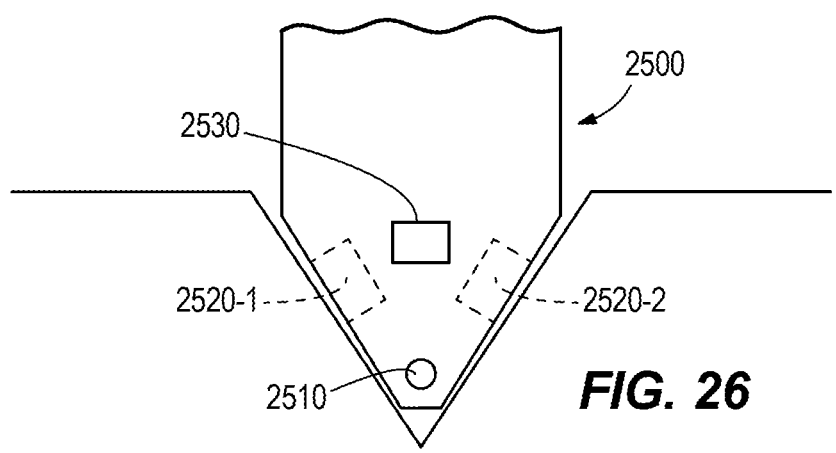
FIG. 26 is a rear view of a portion of the assembly of FIG. 25.

Referring to FIGS. 25 and 26, a seed tube guard 2500 is illustrated having one or more features for applying crop input and/or sensing soil or seed characteristics. An applicator conduit 2510 optionally mounted to the seed tube guard 2500 is optionally used to apply crop input near the seed tube guard 2500 and/or forward of the seed deposition location. In various examples, the applicator conduit 2510 may be mounted to an external surface of the seed tube guard 2500 and/or extend at least partially through an opening in the seed tube guard 2500. One or more sensors 2520 (optionally disposed at least partially inside the seed tube guard) may be disposed and configured to measure one or more soil characteristics (e.g., of the soil forming the sidewalls of the trench). A wear element (e.g., tungsten carbide) is optionally disposed on a side of the seed tube guard 2500 forward of and/or adjacent to the sensor 2520. A sensor 2530 is optionally disposed on a surface (e.g., rearward, lower, forward, etc.) of the seed tube guard 2500. The sensor 2530 is optionally configured to measure one or more soil and/or crop input characteristics. In some examples, one or more sensors may be incorporated in the seed tube guard 2500, but the crop input device (e.g., conduit) may be omitted or located elsewhere on the row unit.

One or more of the sensors 2520, 2530 optionally comprise optical sensors, reflectivity sensors, cameras, electromagnetic sensors, etc. The sensors optionally measure one or more of reflectivity, soil temperature, soil moisture, soil color, organic matter, etc.

The control systems described herein may perform one or more control actions based on measurements made by one or more sensors 2520, 2530. For example, the system may carry out one or more of the following actuations: controlling one or more liquid application valves (e.g., for application of any one or more of the following or a mixture thereof: water, fertilizer, biological, insecticide, fungicide, etc.) such as closing, opening or modifying an application rate of the one or more valves or modifying a product mixture to be applied by the valves; retracting, extending, or modifying a setting (e.g., downpressure, position, angle, aggressiveness, etc.) of a row cleaner, closing wheel, row unit downforce cylinder, or other actuator; controlling a seed metering criteria (e.g., modifying a seeding rate, seed type, etc.).

Although various examples have been described above, the details and features of the disclosed examples are not intended to be limiting, as many variations and modifications will be readily apparent to those of skill in the art. Accordingly, the scope of the present disclosure is intended to be interpreted broadly and to include all variations and modifications within the scope and spirit of the appended claims and their equivalents. For example, any feature described for one example may be used in any other example to any extent and in any combination. Additionally, for example, any of the processes, methods, or operations may be used with any of the examples of structural components disclosed herein and their equivalents.

The invention claimed is:

1. An agricultural row unit comprising:
a frame;
an opener disc rotatably coupled to the frame and configured to open a seed trench;
an applicator assembly coupled to the frame and configured to apply a liquid, the applicator assembly including
a housing, and
a valve coupled to the housing and configured to be in communication with a liquid source, the valve comprising an inlet, an outlet, and a plunger disposed within a plunger chamber between the inlet and the outlet, wherein the inlet, the outlet, and the plunger chamber are all in communication and define a liquid flow path through the housing of the valve, wherein the valve is electronically powered to selectively move the plunger to an open condition with the plunger allowing liquid to pass along and through the liquid flow path to emit from the valve, and electronically powered to selectively move the plunger to a closed condition with the plunger inhibiting the liquid from passing through and along the liquid flow path to emit from the valve; and
a closing wheel coupled to the frame and configured to close the seed trench;
wherein the plunger defines an internal plunger conduit through which the liquid in the plunger chamber flows; and the valve further comprises a pressure chamber along the liquid flow path, wherein a first portion of the liquid flowing through the inlet enters the plunger chamber through a first end of the plunger chamber, and a second portion of the liquid flowing through the inlet flows through the pressure chamber and into the plunger chamber through a second end of the plunger chamber; and wherein (1) the liquid in the plunger chamber selectively flows in two opposed directions through the plunger conduit; or (2) the liquid in the plunger chamber flows in a first direction through the plunger conduit with the plunger of the valve in the open condition, and wherein the liquid in the plunger chamber flows in a second direction through the plunger conduit with the plunger of the valve in the closed condition.

2. The agricultural row unit of claim 1, wherein the valve is electro-magnetically controlled to move the plunger of the valve to the open condition and to the closed condition.

3. The agricultural row unit of claim 1, wherein the open condition is a first open condition position of the plunger within the plunger chamber, wherein the valve is electronically powered to move the plunger to a plurality of open condition positions within the plunger chamber to provide variable liquid flow rates based on the position of the plunger within the plunger chamber.

4. The agricultural row unit of claim 1, wherein the plunger includes a magnet, and wherein the valve further comprises an electrical coil wrapped around an exterior of the plunger chamber to electrically interact with the magnet to move the plunger within the plunger chamber.

5. The agricultural row unit of claim 4, wherein the magnet is one of a plurality of magnets included by the plunger, and wherein the electrical coil is one of a plurality of electrical coils wrapped around an exterior of the plunger chamber to electrically interact with the plurality of magnets to move the plunger within the plunger chamber.

6. The agricultural row unit of claim 4, wherein the plunger includes a displacement magnet, and wherein the valve further includes a displacement sensor configured to sense a location of the displacement magnet.

7. The agricultural row unit of claim 1, wherein the valve further defines a liquid chamber along the liquid flow path, wherein the liquid flows through the inlet, into the liquid chamber, and then the first portion of the liquid from the liquid chamber flows from the liquid chamber into the first end of the plunger chamber. and the second portion of the liquid in the liquid chamber flows from the liquid chamber, through the pressure chamber, and into the second end of the plunger chamber.

8. The agricultural row unit of claim 1, further comprising a seed conveyor, wherein the valve is coupled to the seed conveyor.

9. The agricultural row unit of claim 8, further comprising a seed sensor configured to identify information associated with a seed emitted by the seed conveyor, wherein the valve is actuated based on the information associated with the seed.

10. An agricultural row unit comprising:
a frame;
an opener disc rotatably coupled to the frame and configured to open a seed trench;
an applicator assembly coupled to the frame and configured to apply a liquid, the applicator assembly including
a housing, and
a valve coupled to the housing and configured to be in communication with a liquid source, the valve comprising an inlet, an outlet, and a plunger disposed within a plunger chamber between the inlet and the outlet, wherein the inlet, the outlet, and the plunger chamber are all in communication and define a liquid flow path through the housing of the valve, wherein the valve selectively moves the plunger between an open condition, in which the plunger allows the liquid to pass along and through the liquid flow path to emit from the valve, and a closed condition, in which the plunger inhibits the liquid from passing through and along the liquid flow path to emit from the valve;
an ultrasonic flow meter in communication with the liquid source and the applicator assembly, wherein the ultrasonic flow meter is configured to measure a flow rate of the liquid passing through the valve; and
a closing wheel coupled to the frame and configured to close the seed trench;
wherein the plunger defines an internal plunger conduit through which the liquid in the chamber flows; and the valve further comprises a pressure chamber along the liquid flow path, wherein a first portion of the liquid flowing through the inlet enters the plunger chamber through a first end of the plunger chamber, and a second portion of the liquid flowing through the inlet flows through the pressure chamber and into the plunger chamber through a second end of the plunger chamber; and wherein (1) the liquid in the plunger chamber selectively flows in two opposed directions through the plunger conduit; or (2) the liquid in the plunger chamber flows in a first direction through the plunger conduit with the plunger of the valve in the open condition, and wherein the liquid in the plunger chamber flows in a second direction through the plunger conduit with the plunger of the valve in the closed position.

11. The agricultural row unit of claim 10, wherein the ultrasonic flow meter is disposed within the housing of the valve.

12. The agricultural row unit of claim 10, wherein the ultrasonic flow meter is disposed along the liquid flow path between the inlet and the outlet.

13. The agricultural row unit of claim 10, wherein the ultrasonic flow meter is disposed along the liquid flow path between the inlet and the plunger chamber.

14. The agricultural row unit of claim 10, wherein the plunger includes a magnet, and wherein the valve further includes an electrical coil wrapped around an exterior of the plunger chamber and in electrical communication with an electrical source, wherein electrical current can be sent through the electrical coil in one direction to electromagnetically interact with the magnet to move the plunger to the open condition and in another direction to electromagnetically interact with the magnet to move the plunger to the closed condition.

15. The agricultural row unit of claim 14, wherein the magnet is one of a plurality of magnets and the electrical coil is one of a plurality of electrical coils.

16. The agricultural row unit of claim 10, further comprising a seed conveyor, wherein the valve is coupled to the seed conveyor.

17. The agricultural row unit of claim 16, further comprising a seed sensor configured to identify information associated with a seed emitted by the seed conveyor, wherein the valve is actuated based on the information associated with the seed.

* * * * *